INVENTOR.
LEROY W. BEERS
BY
Edward J. Feeney Jr.
ATTORNEY

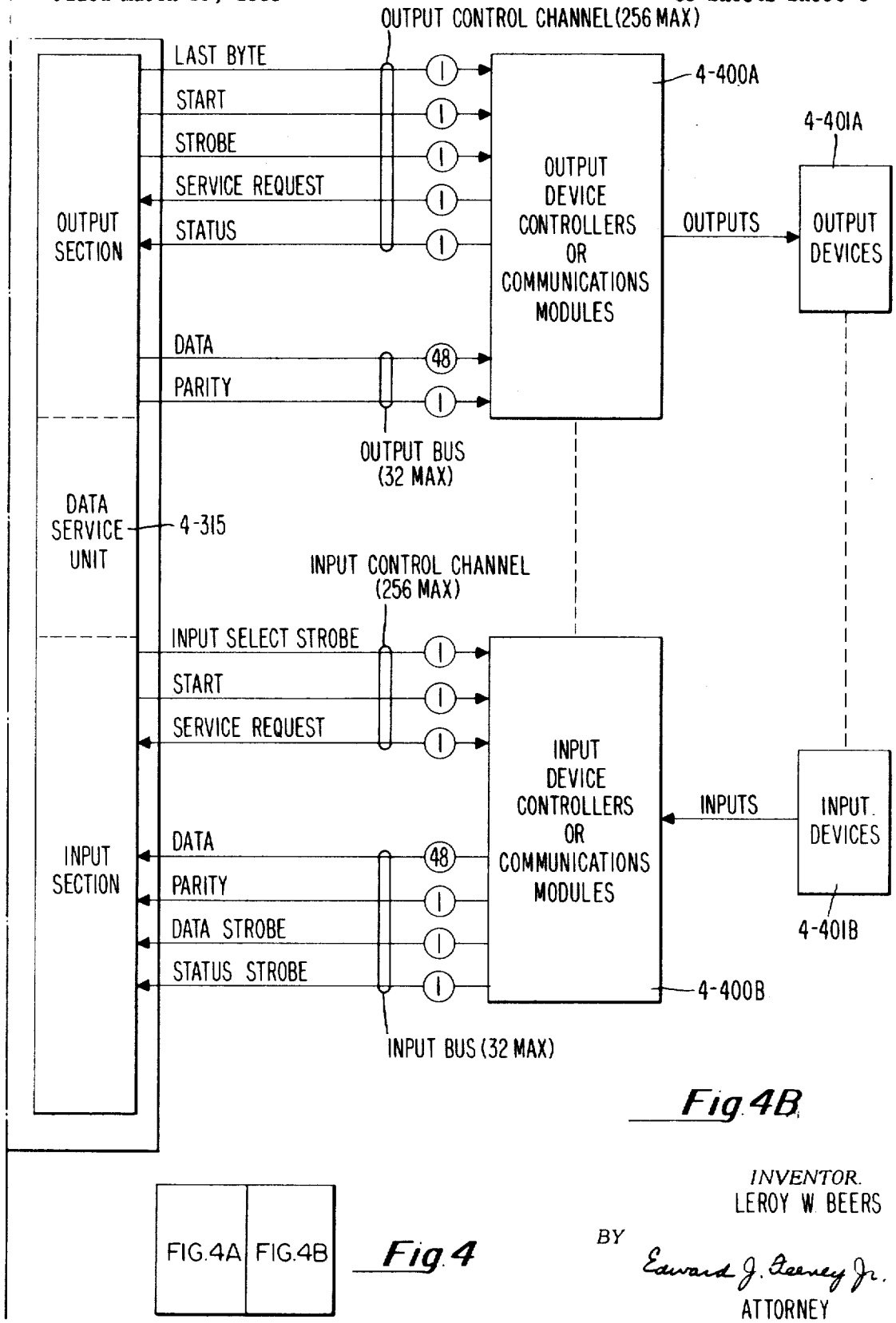

Feb. 2, 1971 L. W. BEERS 3,560,935
INTERRUPT APPARATUS FOR A MODULAR DATA PROCESSING SYSTEM
Filed March 15, 1968 13 Sheets-Sheet 7
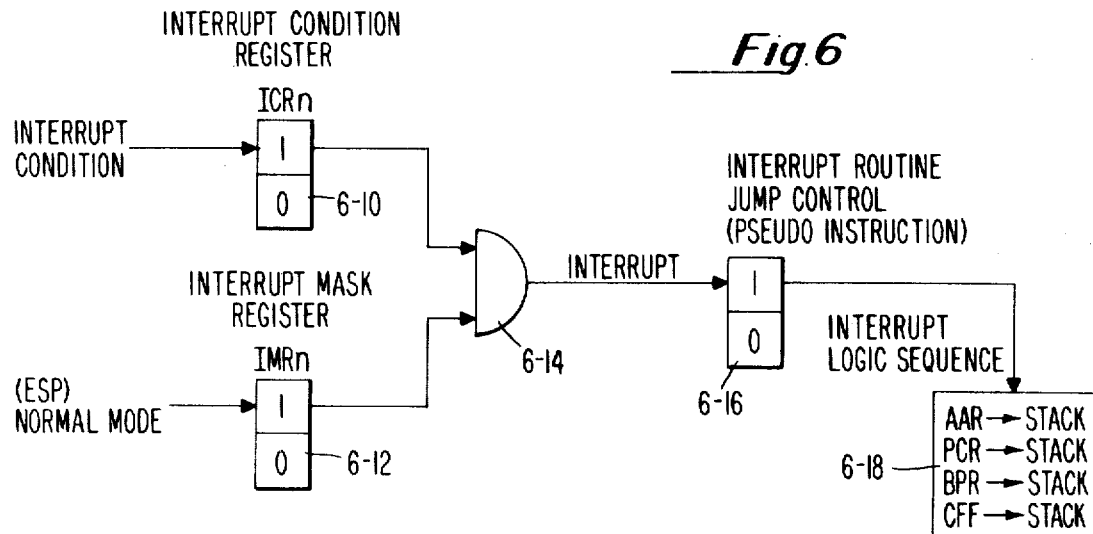
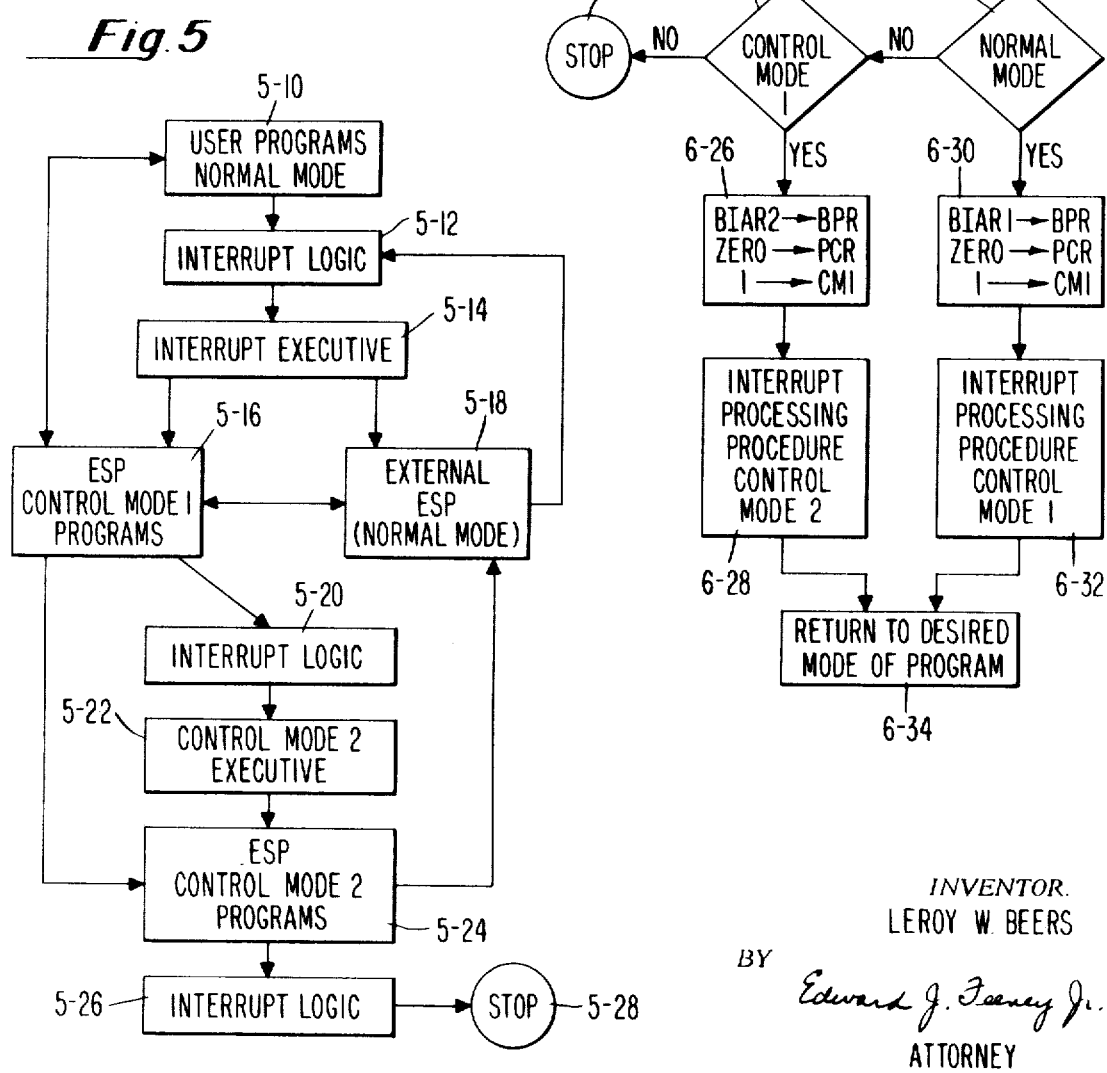
INVENTOR.
LEROY W. BEERS
BY Edward J. Feeney Jr.
ATTORNEY

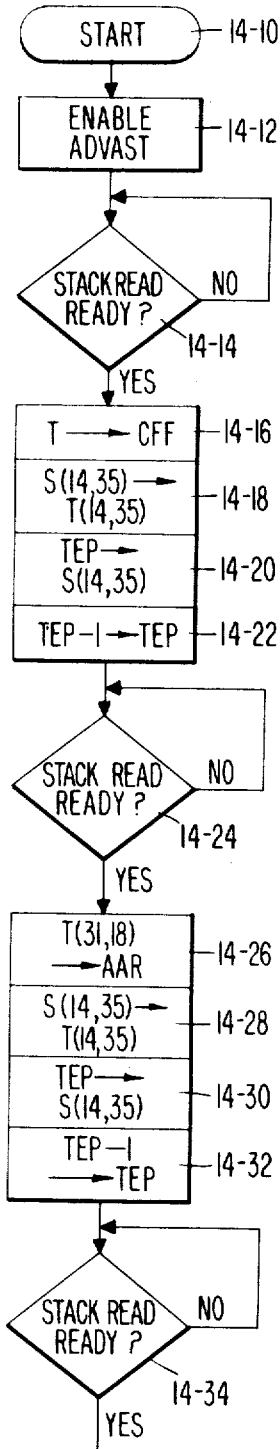
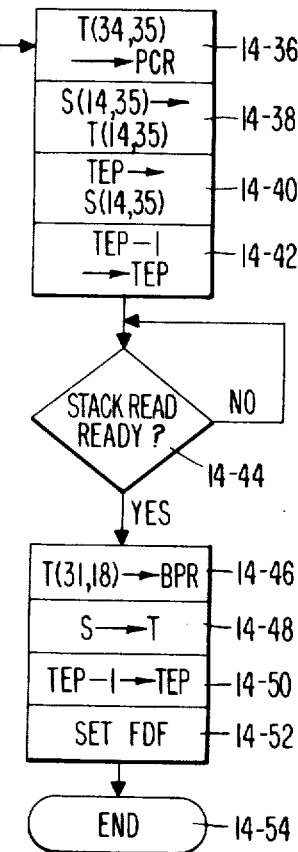
Fig. 14
Fig. 13

United States Patent Office 3,560,935
Patented Feb. 2, 1971

3,560,935
INTERRUPT APPARATUS FOR A MODULAR
DATA PROCESSING SYSTEM
Leroy W. Beers, Downingtown, Pa., assignor to Burroughs
Corporation, Detroit, Mich., a corporation of Michigan
Filed Mar. 15, 1968, Ser. No. 713,426
Int. Cl. G06f 9/18
U.S. Cl. 340—172.5
22 Claims

ABSTRACT OF THE DISCLOSURE

The present application discloses an interrupt system capable of use in a fully modular data processing system. It provides apparatus means for enabling not only recordation and immediate responsive recognition of a comprehensive set of interrupt conditions but also for recordation without immediate responsive recognition of such conditions. In addition, it provides an interrupt system which is operative in its interrupted or control mode to execute object programs which heretofore could be executed only in its normal mode of operation. It also discloses an interrupt system having improved external interrupt capabilities especially in the module fail area.

CROSS REFERENCE TO RELATED APPLICATIONS

A number of patent applications have been filed upon a modular data processing system such as might use this interrupt system. Among them are: "A Modular Multicomputing Data Processing System" by John T. Lynch et al., S.N. 509,718, now abandoned; and "A Central Processor" by George Barnes et al., S.N. 509,908, now Patent No. 3,401,376. They were filed on Nov. 26, 1965. Another related application entitled "An Automatic Interrupt System for a Data Processor" by Blair Thompson et al., has matured into U.S. Pat. No. 3,286,239. Both of these related applications and the issued patent are assigned to the assignee of the present application.

BACKGROUND OF THE INVENTION (a) Field of the invention

The present invention pertains to the field of data processing systems. More particularly it relates to processing systems which are operates under the control of an executive program via interrupt apparatus means. This operation of such systems is known as processing through interruption or more often "interrupt processing." As the name implies, this encompasses data processing systems which operate normally to execute an object or worker program until such time as a control operation is required. The system is then notified of this control requirement by way of an interrupt condition signal. The arrival of this interrupt in earlier systems almost invariably caused an immediate stoppage of data processing by the processor and a jump or shift by the processor to the execution of an interrupt routine. This shift or jump occurred regardless of the relative importance of the condition causing the interruption with respect to the program being halted.

(b) Description of the prior art

Most systems of this earlier type included this immediate interruption feature. However, it was soon realized that in many cases, the interruption causing the stoppage was not only relatively unimportant but in addition, it caused considerably more trouble for the system operation than the importance of the interrupt condition warranted.

For example, where it was necessary to complete the present program at a definite future time, and the interruption stoppage prevented this completion, it was necessary to thereafter attempt to speed up to meet the completion time by performing some of the operations concurrently. This is to overlay the execution of some of the program segments with others. This overlay, of course, required not only more circuitry but also a substantial amount of additional control logic.

When this extra effort was necessitated, for example, by an interrupt signal merely indicating the completion of an input/output (I/O) operation it was decided that such signals should be prevented from interrupting the program being processed at that particular time.

This was accomplished in one previously known system by masking or preventing certain selected interrupt signals from interrupting all programs. An example of this system is disclosed in the aforementioned U.S. Pat. No. 3,286,239 entitled "An Automatic Interrupt System for a Data Processing System" by Blair Thompson et al.

BRIEF SUMMARY OF THE INVENTION

The present invention is an improvement over those earlier systems. In this system, the masking feature providing selective prevention of certain interrupts is included. However, in addition the interrupt is not only prevented from interrupting, but at the same time a condition bit is set so that a record of that interruption is now in the machine. Thus, in the case of an I/O completion interruption the record of the interruption is in the machine and the processor is not automatically connected to any particular I/O Control Module. Rather the processor is turned loose to do something entirely different. Later, at its convenience the control program can come back into that processor and sample the recorded interrupt conditions stored there. Therefore at this time, the control program can reschedule that particular I/O Control Module. Basically this increased versatility has been accomplished by logically locating the mask register between the condition register and the processor control circuitry.

Another novel improvement is provided by making the control mode bits part of the mask register. By this feature the system control program can shift the processor from its control mode back into its normal operating mode while actually maintaining the processor in its control mode. This provides a number of useful and desirable results. Most notable is the ability of the processor to continue execution of an interrupted normal mode program while remaining under control of the executive program. Previously, when an interruption occurred, the processor automatically shifted to a Control mode. Then the executive program would start a series of diagnostic tests to determine the details of the interruption. Now in many cases, it is desirable to continue the execution of the normal mode program to determine more information regarding the source of the interruption. However, in spite of this, previous systems placed the entire burden upon the diagnostic programs contained in the executive program. In the present system, this ability to continue operation of the interrupted program enables the system to determine further information about the true cause of the interrupt without being continually interrupted while executing the normal mode program.

BRIEF DESCRIPTION OF THE DRAWINGS

The present invention will be more fully understood when the following description is considered together with the accompanying drawings in which:

FIG. 5 is a signal flow diagram showing the flow lines of interrupt control;

FIG. 6 shows the interrupt routine entry flowpath in the Central Processor Module of FIG. 2;

FIG. 13 is a flow diagram for the ADVAST portion of the Central Processing Module during an Interrupt Routine Return (IRR) instruction; and FIG. 14 is a flow diagram for the same instruction as FIG. 12 but illustrating the flow through the Final Station (FINST) portion of the Central Processing Module of FIG. 2.

DETAILED DESCRIPTION (INCLUDING PREFERRED EMBODIMENT)

General information

The interrupt procedure is the interface between the hardware interrupt system and the software interrupt servicing routines.

The interrupt procedure processes both interrupts and requests to resume a suspended process for both ESP and user. The interrupt procedure is "entered" by the hardware interrupt system or by a procedure call. The interrupt procedure performs the function of disassociating user jobs from processors on interrupt by sorting the state of the processor in a Hot Job Table (HJT). Interrupt determination and register storing/adjustment are performed and an appropriate status is entered in the Hot Job Table and/or the system interrupt table.

The interrupt procedure has a fixed working area associated with each Central Processor Module. These work areas are established at compile time, and used at interrupt time. Due to the state of processor registers, at the time of interrupt, some of the interrupt procedures variables must be Base Program Register (BPR) relative. The result is that the work area for the Interrupt Procedure is handled slightly different than other data arrays (DA).

When the interrupt procedure has performed its function, it will set up and call the scheduling procedure. Set up in this case implies setting the appropriate registers to use the stack, the data array code of the scheduling procedure. The stacks and data arrays (one of each per processor) of the scheduling procedure are established as arrays in the only logical language (TOOL) at compilation time.

The bulk of the ESP does not involve interrupts or being interrupted. If system interrupts occur while ESP is processing in I/O, allocation, filing, etc., the interrupt system records the interrupt, and returns to the interrupted process. Note that standard internal routines function effectively as non-interruptable.

It is also noted here in this general dissertation that because of the large number of abbreviations, acronyms and relatively new terms that are included in this application, that there is included at the end of this description a rather complete list of such abbreviations and acronyms as well as a full glossary. These lists will identify and define any unusual or abbreviated term used herein.

Figure 1:
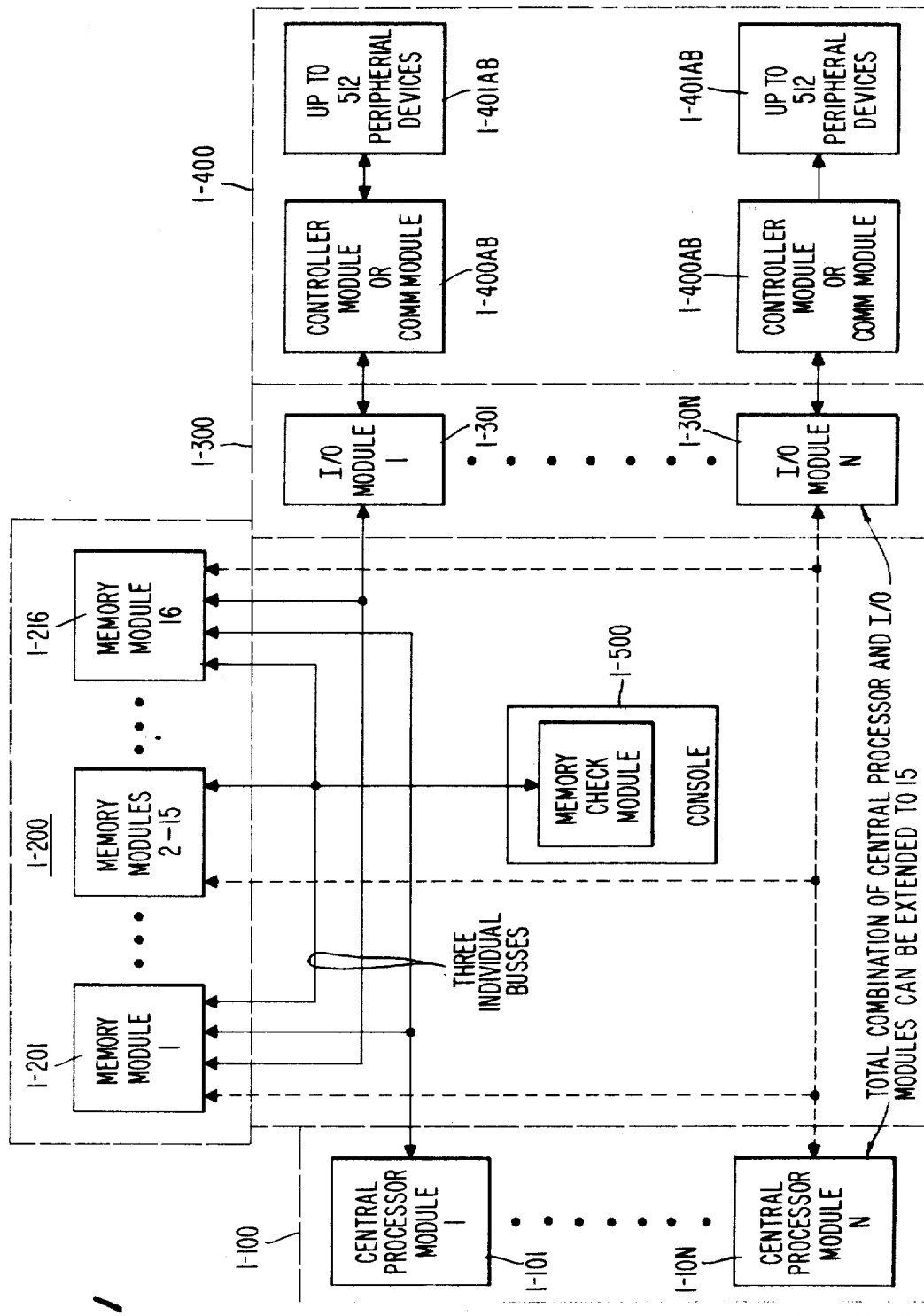
FIG. 1 is a block diagram of a data processing system organization such as might use this interrupt system.

Referring to FIG. 1, in particular, there is shown the general organization of a data processing system which might use the present interrupt system. The heart of the system is the Central Data Processing Modules 1–100, the Memory Modules 1–200, the Input/Output Modules 1–300 and the console 1–500 which includes the Memory Check Module. The three basic modules (processor, memory and I/O) are arranged into a central system cabinet configuration. A central data processing system may contain one or more Processor Modules, one or more I/O Processor Modules and a maximum of sixteen Memory Modules. The total combination of Processor and I/O modules may be extended to fifteen (15). That is, if only one Processor Module is used, fourteen (14) I/O Modules can be used.

The system also includes one or more Controller Modules or Communication Modules 1–400AB, and the necessary number of peripheral devices 1–401AB (such as disk file systems, magnetic tape systems, card readers, etc.).

Figure 2A:
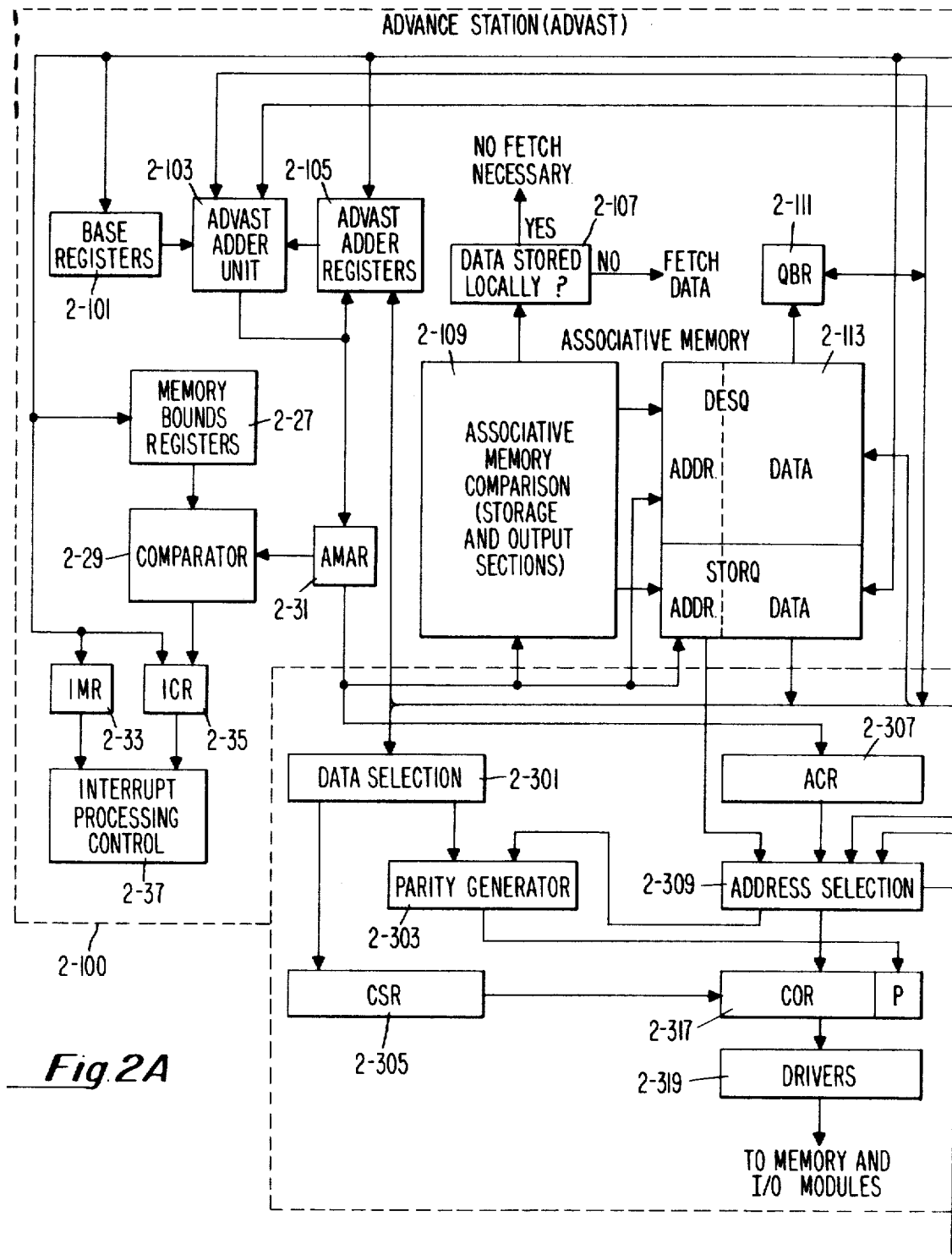
FIG. 2 includes FIGS. 2A and 2B and is a simplified block diagram of the Central processor module of the data processing system shown in FIG. 1.
Figure 2:
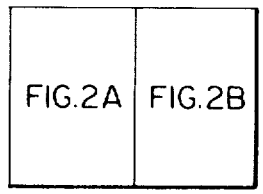
Figure 2B:
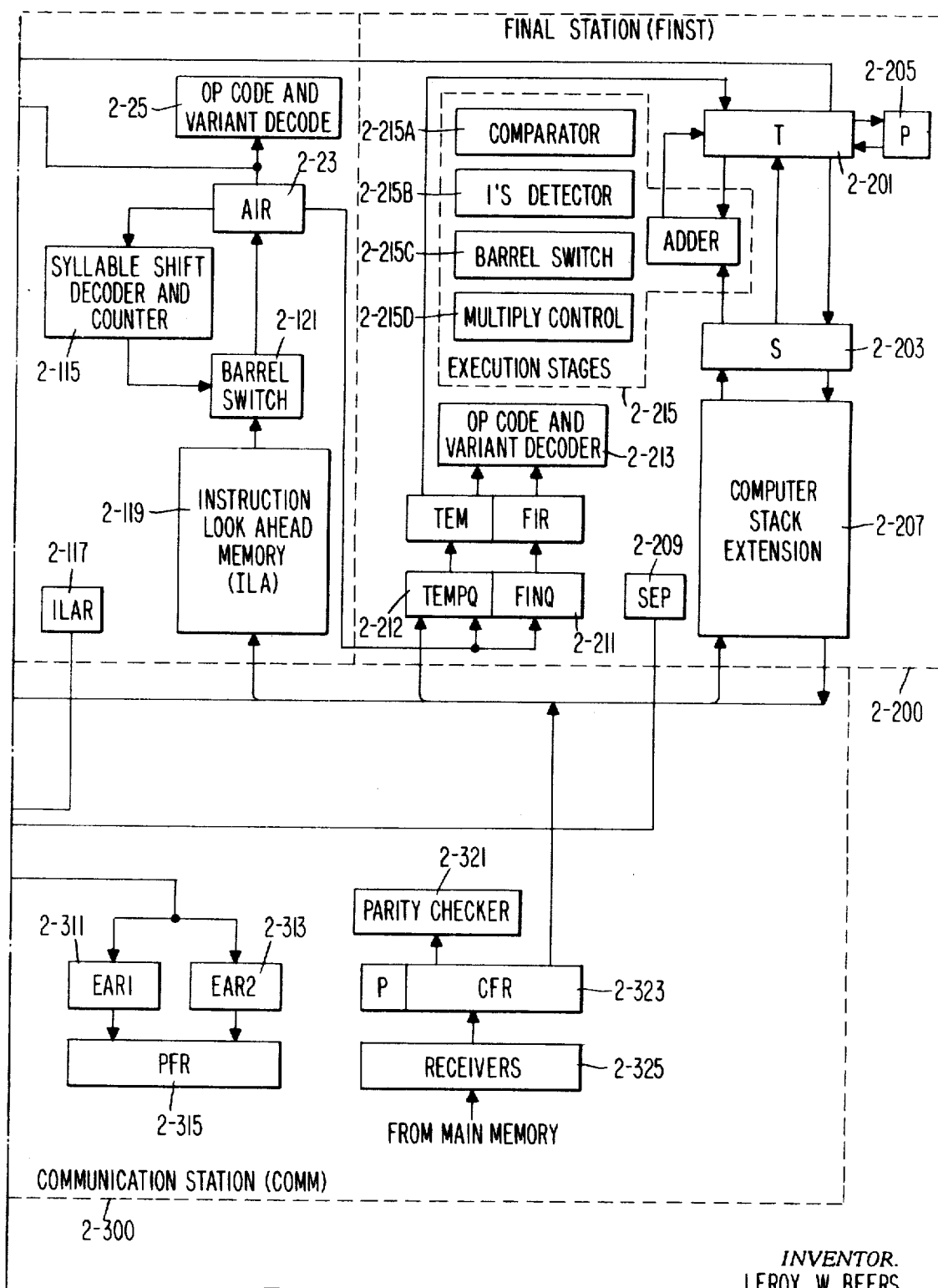

The Central Processor Module 1–101 is shown in greater detail in FIG. 2. The number of Central Processor Modules, as well as I/O Control Modules depends entirely upon the application of the system. However, when more than one Processor Module is used the Executive Scheduling Program (ESP) dynamically manages the job assignment of each Processor Module through the Processor Control Registers. Thus, any program can be executed by any Processor Module, there being no fixed master/slave relationship between the Processors.

If more than one Processor Module is available and the asynchronous segments of a program are indicated, the segments can be simultaneously processed on the multiple processor modules.

Thep rimary functions of the Processor Module are to execute arithmetic calculations and to control functions, data transfer operations and interrupt services.

It basically includes three stations: the Advance Station (ADVAST), the Final Station (FINST) and the Communication Station (COMM). In general the interfacing, fetching and storing functions are accomplished by COMM, the address arithmetic is performed by ADVAST and the operations usually associated with data manipulation are performed by FINST. The simplified block diagram of FIG. 2 shows the principal paths for the flow of data and control information between the three stations. The functions of each of the three stations will now be described in greater detail with reference to the FIG. 2.

The Central Processor Module interfaces with the main memory and I/O modules by means of the communications station 2–300. Specifically the elements of COMM interfacing with the other modules are the Receivers 2–325. Drivers 2–319 and the Communications Timing and Control Unit. The function of each of these interface elements follows:

RECEIVERS—Accept and standardize incoming data from the Memory and I/O modules.

DRIVERS—Supply power to drive data going from the Central Processor to the Memory and I/O modules.

TIMING AND CONTROL—Directs sequential operations required by the communications process, including service monitoring, and priority and conflict resolution.

COMM constantly monitors the internal operations within the Central Processor Unit by serving as the sensor for units within the Advanced Station (ADVAST) and Final Station (FINST) areas. As memory accesses are required by these units, COMM provides the necessary interconnection between the Central Processor and the desired Memory Module.

Description of logical operation

A typical operation has its origin as a read operation from a selected memory. The instruction arrives at the Central Processor via the Receivers 2–325 and is transmitted to the Communications Fetch Register (CFR) 2–323. A parity check is performed by Parity Checker 2–321 on the incoming data and if the correct parity (odd) is sensed, the COMM Unit Control will enable data flow to one of four possible units depending upon the type of information which was received from memory. The four units within the Central Processor are:

(1) The Stack Extension 2–207—a twelve word (52 bit word) local memory.

(2) The Temporary Queue 2–212 (TEMQ)—four data storage locations within the FINST 2–200.

(3) The Instruction Look Ahead 2–119 (ILA)—a twelve word local memory within ADVAST 2–100.

(4) The Associative Memory 2–113—a 28 word local memory within ADVAST 2–100.

The Associative Memory 2–113 is further sub-divided into two sections, the Storage Queue (STORQ) and the Descriptor Queue (DESQ).

The selection of the particular unit within the Central Processor which will receive the data from COMM is determined by contents of the ADVAST communications register ACR 2–307.

Memory module linkages to the four units within the Central Processor Unit are grouped into two functional classes: "need" (automatic) and "demand" (Programmer control). The "need" linkage is a hardware implemented function which is not directly under program control. The "demand" linkage is directly controlled by Instructions, i.e. Fetch Memory to Stack (FMS), or Store Stack to Memory (SSM).

If the requested address involves address computation which results in a memory reference, the address is checked against memory bounds in ADVAST Comparator Unit 2–29. Any violation will cause an interrupt to be sent to the Interrupt Condition Register 2–35. The address is also presented to the associative memory to determine if the word requested is stored locally in STORQ or DESQ. If the request word is not in local memory, the address is passed on to the COMM address register (CAR) together with control information telling COMM where to place the contents of this address when it arrives from memory. The Description Queue (DESQ) is serviced by COMM on both a "demand" and a "need" basis. Any fetch reference made to Main Memory by the Central Processor that is relative to the base index register or the program reference table is placed in the associative memory by COMM 2–300.

The storage queue (STORQ) of the Associative Memory 2–113 in ADVAST is continually monitored by COMM 2–300 and serviced on a "need" basis. The STORQ requires "store only" service, and COMM stores data from STORQ to Main Memory to keep STORQ available for use by FINST 2–200.

The PRTQ is the local storage for the most recent PRT-relative references to Main Memory. PRT provides a local storage for control words used in program jumps and words containing alternate memory address bounds. This is contained in the Associative Memory 2–113. The execution of all program jumps is controlled by ADVAST 2–100. The initializing of the jump control register is accomplished by ADVAST 2–100, as is the distribution of the jump control word and the formation of the return control word.

COMM 2–300 monitors the Stack Extension 2–207 and control the execution of store and fetch operations in order to maintain a certain predetermined number of operands for use by FINST 2–200. COMM monitors ILA 2–119 similarly to the way in which it monitors the Stack Extension 2–207, but differs in that there is only one-way service required, i.e. information flowing only to the ILA. COMM provides store only service to the STORQ by transferring data to memory module periodically, thus keeping the STORQ available for use by FINST. COMM provides input data to the TEMQ unit, upon the direction of the ADVAST unit, which in turn initiates all requests for service. IDXQ units are also in the associative memory 2–113. They receive input data under control of the COMM unit. IDXQ contains all words that are referenced by any of the index instructions. PRTQ contains the most recent references to program segments and procedures that have been utilized during the execution of the program. If the IDXQ/PRTQ is full at the time, COMM will remove the oldest piece of data in the Queue and return it to Main Memory or destroy it. Output flow from the COMM unit is via the Communications Address Register (CAR) 2–309 and the Communications Store Register (CSR) 2–301. The CAR contains address and control information while the CSR contains data. Prior to transmission of data and address information, parity is provided to each from the Parity Generator 2–303.

ADVANCED STATION (ADVAST)

All instructions executed in the Central Processor are handled by ADVAST 2–100. Those instructions which are strictly FINST operations are simply decoded by ADVAST and then transferred to FINST. ADVAST also senses all interrupt conditions, responds to specific interrupt situations and controls the preliminary interrupt processing sequences.

ADVAST is the program processing portion of the Central Processor. All ADVAST operations begin at the Instruction Look Ahead (ILA) 2–119. ILA is a local memory unit used for buffering instructions words of the current program much in advance of their use. The capacity of ILA 2–119 is 12 words with 52 bits per word. Since the longest instruction contains four 6-bit syllables, the minimum buffering available is for 24 instructions. With this amount of "look ahead" COMM keeps the ILA sufficiently ahead of actual ADVAST computations to effectively "mask" the time taken in fetching program words.

COMM 2–300 monitors ILA 2–119 and services it on a "need" basis, automatically executing fetch operations to maintain a predetermined number of instructions in ILA. Instructions are taken from ILA in sequence and placed in the ADVAST instruction register (AIR) 2–23. AIR holds the current OPCODE syllable and associated variant and/or address syllables. The operation and variant syllables are decoded by ADVAST control to determine what operations are to be performed, if any, by ADVAST. If no further ADVAST operations are required, the instructions are transferred to FINQ 2–211 and TEMPQ 2–212 in the Final Station 2–200 where operator and operand processing is completed.

The combination of OPCODE and variant 2–25 determines if address arithmetic is to be performed by ADVAST and, if so, which base register is to be applied, and what limits are to be employed in the memory bounds registers 2–27 in the ADVAST comparator unit (ACU) 2–29. If the requested address is stored locally (in ADVAST) and does not require any action by COMM 2–300 the associative memory 2–113 automatically cycles the local queue (PRTQ, IDXQ, or STORQ) containing the desired word, causing this word to appear at the output. If the requested word is to be used by ADVAST, it is available for computation at the queue output. If it is intended for FINST, ADVAST transfers the word to TEMPQ 2–212, which is the Final Station's local operand queue. An arithmetically derived address which is not found in local ADVAST memory must be fetched from a Memory Module via the COMM unit 2–200. Once COMM is signalled to fetch a word intended for the final station, ADVAST 2–100 does not have to wait for the fetch to be completed. Instead, ADVAST 2–100 is free to move onto the next instruction.

Address arithmetic involves the ADVAST adder 2–103 which has three inputs—the address syllable, a base register, and an index amount—thus enabling one pass addition of the address syllable in the instruction string. Indexing is applied to address computation by means of the ADVAST address register (AAR) 2–105. The AAR 2–105 is the accumulator for indexing arithmetic. The local queue may contain up to 24 index words, thus enabling most indexing to be accomplished without reference to Main Memory.

FINAL STATION (FINST)

The Final Station 2–200 is the portion of the Central Processor which performs arithmetic and logical operations, and all stack and stack test operations. All FINST operations are initiated by instructions taken in sequence from the final queue (FINQ) 2–211 which receives its instructions from the ADVAST instruction register 2–23.

As ADVAST completes its preprocessing of instructions requiring FINST operations, it places the OPCODE in FINQ 2–211, and the associated variant syllables or locally stored operand in TEMPQ 2–212. If an operand is involved which must come from Main Memory ADVAST presents COMM with a TEMPQ address where COMM will place the operand when it arrives. (TEMPQ is serviced by COMM on a "demand" basis.)

Instructions are transferred one at a time in FINST from the final queue (FINQ) to the FINST instruction register, which holds the instruction until it is executed by the FINST hardware 2–213. This execution hardware 2–213 includes a Comparator 2–215A which is used for all stack and field testing, and also for logical functions such as "IMP" and "OR," and some field manipulations such as "Clear Field" and "Complement Field." The ONE's Detector 2–215B is used for normalization and conversion from integer to floating point. It is also used in stack and field testing against zero. The adder is used for arithmetic operations only such as addition, subtraction and division. Shifts and field manipulations are accomplished through the high speed barrel switch mechanism 2–215C. Multiplications are performed in the multiplier 2–251D. The data which is to be operated on by the FINST hardware is transferred from TEMPQ to the top of stack T register 2–20 which is the accumulator for FINST. The S register 2–203 and the stack extension also contain operands.

The results obtained from the hardware operating on the data can be "pushed down" into the stack for temporary storage until needed again as an operand, or else the data can be transferred from the T register 2–201 to STORQ in the Associative Memory 2–113 of ADVAST for eventual transfer to Main Memory.

The Stack Extension 2–207 in FINST is serviced on a "need" basis. COMM monitors its contents and automatically executes store or fetch operations to maintain a certain predetermined number of operands for use by the FINST hardware.

Finst 2–200 is dependent upon ADVAST 2–100 and COMM 2–300 only to the extent that to be operating there must be something in FINQ 2–211 and TEMPQ 2–212. As long as there is a queue of FINST instructions, FINST does not have to halt and wait for ADVAST or COMM. There is a special instruction which halts ADVAST when this instruction appears in the ADVAST Instruction Register. ADVAST does not begin processing again until this instruction reaches the FINST Instruction Register.

Stack operation

The stack within the FINST consists of a T register 2–201 (top of stack), an S register 2–203 (second position of the stack) and a 12 word stack extension 2–207. Operands are locally stored within the stack area to the limit of 14 words (52 bit/word). Further operand inserts into the stack are extended beyond this limit to a memory module.

Central Processor instructions pertaining to the stack are normally referenced to the T 2–201 and S 2–203 registers. As data input are applied to the stack they are stored in successive locations beinning at the T register, progressing to the S register and henceforth into succeeding locations of the stack extension. As the usual computational operations involve two operands, the availability of these operands in the T and S registers provides the means of implementing instruction execution. Should double precision operations be desired adjacent areas within the stack are used for storing the most and least significant members of the operand. An additional register, the P register 2–205 is brought into operation for some of these double precision instructions (e.g. Multiply Double) The P register 2–205 may be considered as an extension of the T register 2–201.

Figure 3:
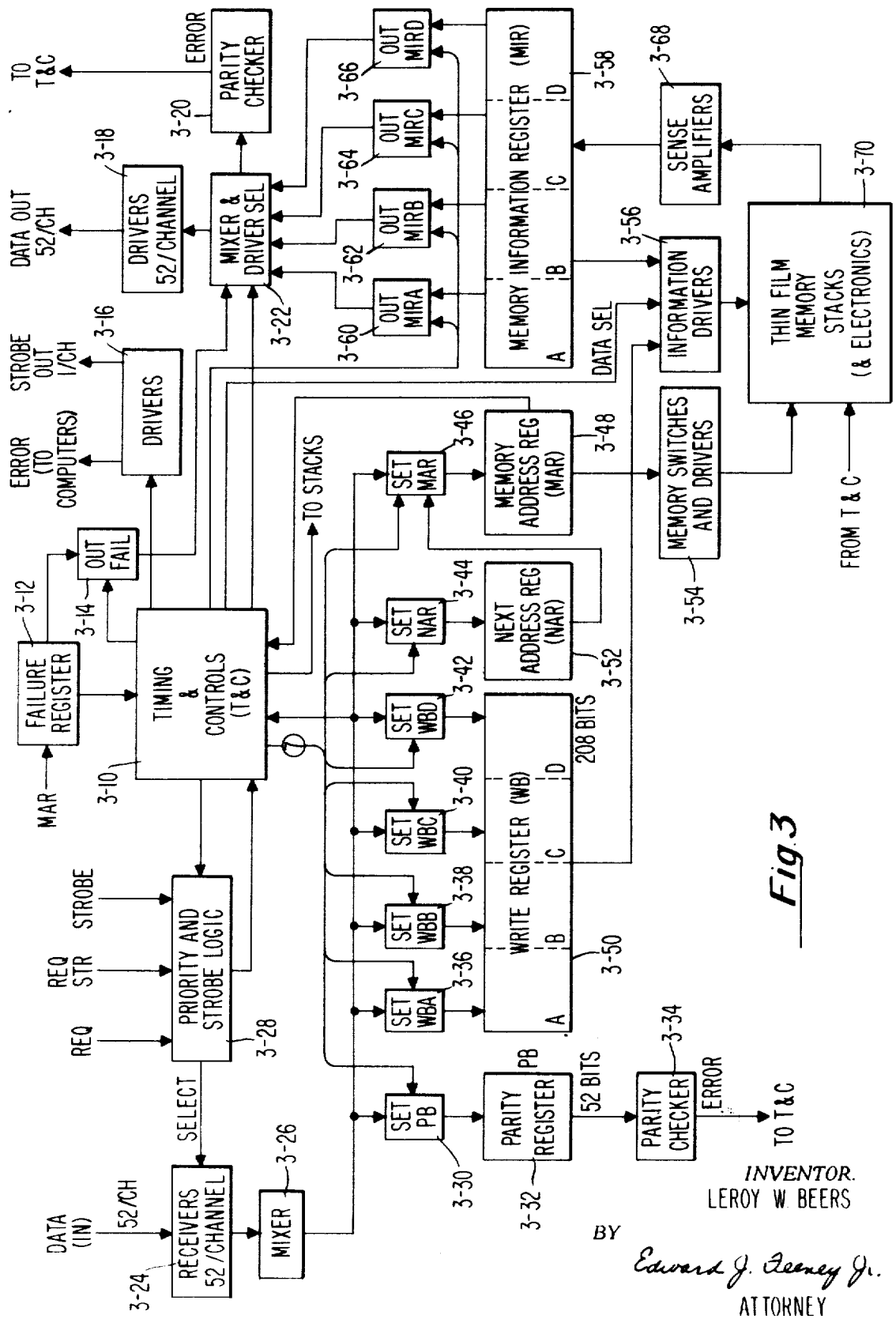
FIG. 3 is a simplified block diagram of the Memory Module used in the same data processing system.

The Memory Module shown in FIG. 3 provides high-speed, random access thin-film storage for the present modular system. A single module has a 16,384 word capacity with a word length of 52 bits. It retains information as directed by the Central Processor Modules or I/O modules in the system. The memory module is physically contained in two cabinets. This unit provides 16 busses for data transfer to as many as 16 other modules. Each bus has 52 parallel lines for input and 52 parallel lines for output. The system may be expanded to a level of 16 memory modules, thereby providing a rapid access capability of 262,144 words for a full complement of modules.

The operation of the Memory Module is started by a request from a module with which it is interfaced. The requesting module transmits a request, a request strobe and data (Control Word). The request (REQ) signal is used for priority control within the Priority and Strobe Logic 3–28 where request evaluation is performed. The input data is entered into receivers 3–24. The request is accepted by the memory if its channel has the highest priority of any active channels. The request strobe is used to transfer the control and address portions of the Control Word into their respective memory module areas. The request strobe also sets a "busy" signal, which is used to indicate memory status to subsequent requests from other modules during the completion of the current memory operating cycle. An acknowledge (ACK) signal, indicating the memory module acceptance of the Control Word is sent to the initial requesting module.

The operations code (OPCODE) portion of the Control Word (shown below) describes the type of operation (read or write) which is to be performed between the memory and the requesting device.

The four OPCODE syllable bits have the following meanings:

| ↓ Bit | Value→0 | 1 |
|---|---|---|
| P | 0 Fetch | Store. |
| o | | |
| s | 1 1-word | 4 words. |
| i | | |
| t | 2 Normal | Modify tag. |
| i | | |
| o | 3 Zeros or normal | Ones or fail word. |
| n | | |

The ADDRESS consists of 18 bits and thus has the range to select the 262,144 words of data which a full complement of memory modules can provide.

When a 4-word memory operation is specified, Address bits 46 and 47 must be zeros for normal word order to be maintained, i.e. word 0 through 3 of the selected 4- word address. A different word code in the two least significant bits of the Address will result in processing the selected word first followed by the remaining three words in a cyclic fashion.

A fetch OPCODE describes one of four possible operations which will transfer data from the memory module to the requesting device. The operation is sensed in the Timing and Controls section 3–10 and the address is recorded in the Memory Address Register (MAR) 3–48. The specified address enables corresponding Memory Switches and Drivers 3–54 which select the word location within the thin-film memory stacks 3–70. Read Cycle Control signals from the Timing and Control Section 3–10 initiate the read cycle and the Sense Amplifiers 3–68 receive data readout information from the thin-film Memory 3–70.

The Information Register 3–58 stores the four word data which is further selected by the word select logic MIRA 3–60 through MIRD 3–66. The word is transferred to the requesting module via the Mixer and Driver Select logic 2–22, the Drivers 3–16, 3–18 and the final output stage within the memory module. A strobe output is also provided at the driver stage 3–16 for transmittal to the requesting module along with the data. The conclusion of the fetch operation includes the return of the word to the location in the thin-film memory which was accessed. This is accomplished by way of the Information Register 3–58 to Information Drivers 3–56.

A store OPCODE describes one of two possible write operations which will transfer data from the requesting module into the memory module of FIG. 3. The operation is either a single-word or a four-word store. The request is sensed by the Priority and Strobe Logic 3–28, a request strobe transfers the Control Word Operation into the Timing and Controls section 3–10 and the address into the Address Register 3–48. As in the fetch operation, the Memory Switches and Drivers 3–54 corresponding to the Memory Address specified by the Control Word are selected and the store cycle is initiated by the Timing and Control section 3–10. The data input is sensed by the Receivers 3–24 and Mixer 3–26, transferred under Control Word direction through the Write Controls (WBA through WBD) 3–36, 3–38, 3–40 and 3–42 and stored in the 208 bit Write Register 3–50. The data is transferred through the Information Drivers 3–56 into the Thin-film Memory 3–70 where the write operation terminates.

The Memory Module checks each word received or transmitted for odd parity. Upon detecting incorrect parity the Memory Module interrupts the Processor Modules and retains pertinent information concerning the failure in the Memory Module Fail Register 3–12. Additional check capabilities are provided by single pulse operation and automatic checking. A control panel is provided on the Memory Module which contains controls and flip-flop indicators permitting single pulse operation under manual control for maintenance purposes. Each Memory Module is, as shown in FIG. 1, permanently connected to the Memory Check Module 1–600. This module has the capability of automatically excercising all of the locations and functions of each of the Memory Modules 1–100.

The Memory Module Fail Register 3–12 records Fail Word data, including a copy of the Control Word for the operation which was being performed when an error was detected. The channel number and memory module number are also provided to show the module interconnection involved. The Fail Word format is shown below.

| 0 | 3 4 | 6 7 | 11 12 | 15 16 | 19 20 22 |
|---|---|---|---|---|---|
| OPCODE | 0 | Error Bits | 0 | Channel No. | 0 |

| 23 | 26 27 | 29 30 | 47 48 | 50 51 |
|---|---|---|---|---|
| Memory Module No. | 0 | Address | 0 | Parity |

The error bits are defined as follows:

| Bit: | Error |
|---|---|
| 7 | Parity Error-Control Word. |
| 8 | Parity Error-Incoming Data. |
| 9 | Wrong Memory Address-Control Word. |
| 10 | Parity Error-Outgoing Data. |
| 11 | Illegal Operation Code-Control Word. |

Bit No. 51 of the memory fail word is used for parity purposes to provide a check on the instruction word. Its purpose is to indicate the overall bit composition of a word and thus provide a means of error detection.

Figure 4A:
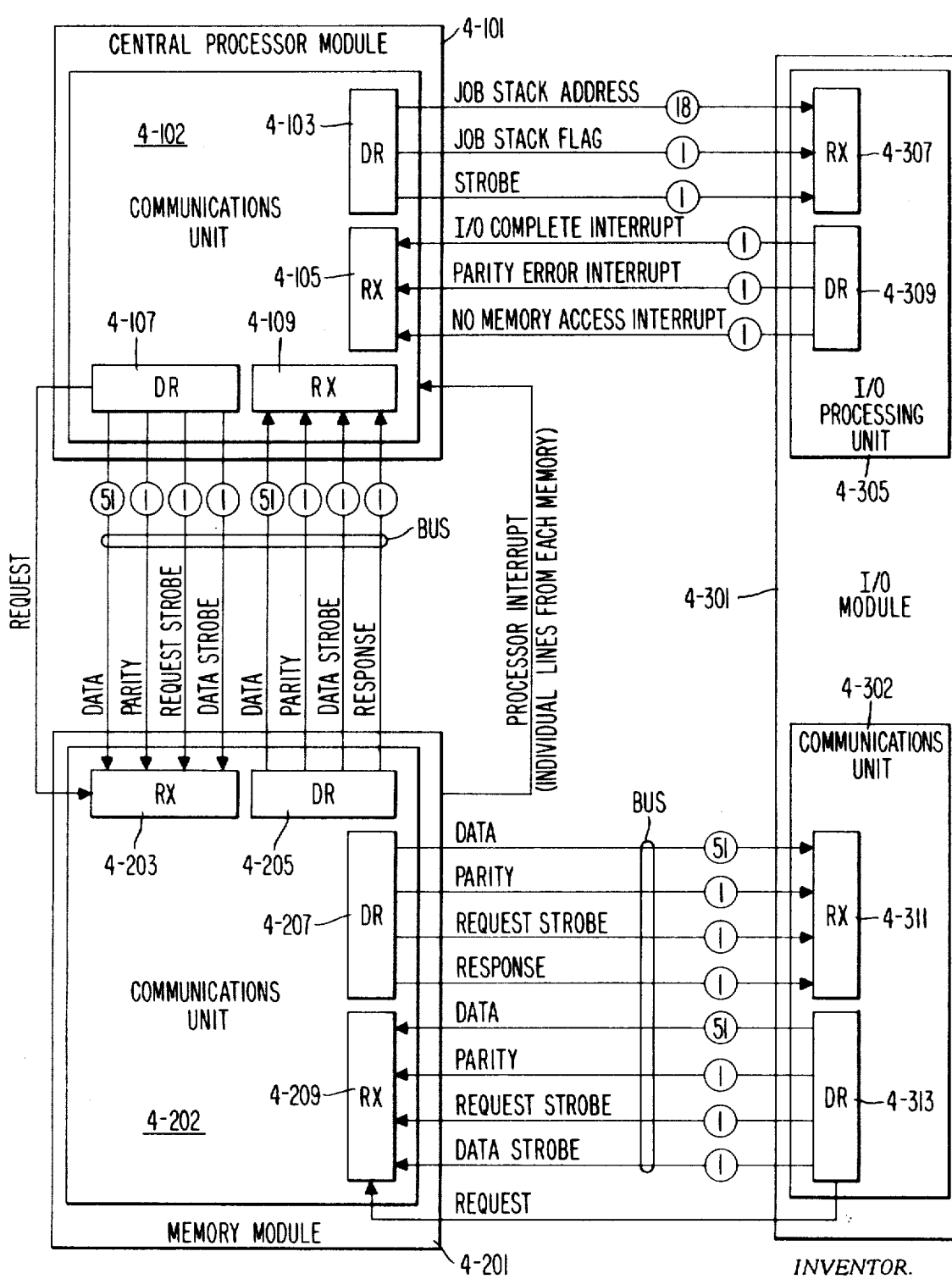
FIG. 4 includes FIGS. 4A and 4B and is a system interface and information flow diagram between the modules of the data processing system.

Next refer to FIG. 4 which indicates the interface connections of the modules within the overall system.

A Memory Module 4–20 interfaces with the I/O 3–301 and Central Processor 3–101 Modules of the system. Inter-module communications are accomplished over 16 busses each of which contains 52 parallel lines for input and 52 parallel lines for output plus one partity line in each direction.

All interfacing is accomplished through the use of units within the various modules. FIG. 4 shows the interfacing between the units, the configuration of the units, and the signal flow in the system. These units contain the necessary fetch, store and address registers, logic circuits, timing and control circuits, drivers and receivers to coordinate the transfer of data between the modules.

Each I/O module 4–301 has the capability of interfacing with 512 simplex (one-way) peripheral devices 4–401A and 4–401B over 512 individual control channels (256 input and 256 output) as well as 64 data transfer busses (32 input and 32 output). Peripheral equipment controllers contained in common controller modules 4–400A and 4–400B are used to provide the proper interfacing of data and control signals between the I/O modules 4–301 and the various peripheral devices. These controllers supply any necessary data buffering to ensure that no data is lost while an I/O module is servicing other channels. Communications modules are used specifically to interface I/O modules with communications lines (such as Teletype lines) to minimize the possibility of a single component failure disabling more than a single communication line. The interface circuitry in the communications modules provides for compatibility between the communication devices and the I/O modules.

Information flow between portions of the system involves three phases: input, processing, and output. The main thin-film memory (in the memory modules) is a high-speed random access temporary storage device for information to be handled during each of the three phases. During the input phase, information is transferred from the input peripheral devices 4–401B to the main memory 4–201 by way of the peripheral controllers 4–400B, I/O Modules 4–301 and the Disc Sub-system. During the processing phase, the information in main memory 4–201 is transferred to and manipulated by a processor 4–401 upon completion of which the data is returned to main memory 4–201. During the output phase, the information is taken out of main memory 4–201 and handled as output information, traveling the reverse route of the input data flow.

Communications between peripheral equipment and the I/O modules is handled by peripheral equipment controllers, communications modules and the data service units in the I/O modules. The data service units contain the necessary registers, buffers, and control circuits to manipulate input/output information of various byte sizes and speeds. Each of the 64 data busses has the capability of handling, in parallel, a byte size of 51 data bits plus one parity bit. The byte size of data handled is determined by the type of peripheral device used. For example, if an I/O module is communicating with 8-to-100-word-per-minute Teletype lines, a 6 bit byte size would be sufficient to ensure that each of the individual Teletype lines is serviced without the loss of data.

The peripheral equipment controllers 4–400A and 4–400B contain the necessary drivers, receivers, registers, parity check and generating logic buffers, converters and timing control circuits to buffer and transfer data between devices and I/O modules. Communications between I/O modules and peripheral equipment controllers is accomplished by the use of 512 control channels and 64 data transfer busses. The 512 control channels are divided into 256 input channels and 256 output channels. The output channel control signals transmitted from an I/O module to a peripheral equipment controller include the last byte signal, the start signal, and the device select strobe. Output control signals sent from peripheral equipment controllers to the devices include status and service request signals.

Input control signals sent from I/O modules to peripheral equipment controllers include the start and input select signals, and a service signal is sent back from peripheral equipment controllers to the I/O modules.

Data word transfers on each of the 32 output busses include 48 data bits and one parity bit. Data transfers on each input bus include 48 bits, one parity bit and a status strobe.

Communications between I/O modules and central processors

As shown in FIG. 4 communications between processors and I/O modules are handled by communications unit 4–102 in each processor 4–101 and by the processing unit 4–305 in each I/O module 4–301. The communications unit 4–102 in a processor contains the necessary drivers 4–103 and receivers 4–105 to drive signal lines to the I/O modules and to receive standardized signals from the I/O modules. The I/O processing units 4–305 contain registers and control circuits which control the input/output communications with a processor. Each set of data transferred from a processor to an I/O module includes 18 bits for the job stack address, one bit for the job stack flag, and one strobe bit. Each set of data transferred in the reverse direction from an I/O module 4–301 to a Processor Module 4–101 includes the I/O complete interrupt, parity error interrupt, and the memory access interrupt bits.

Communications between processors or I/O modules and memory modules

Communications between the processors or I/O modules and the memory modules is handled by the communications unit in each processor, I/O and memory module. The communications unit in the processor 4–102 and the I/O modules 4–302 contains:

(a) Fetch and store registers which buffer information transferred to and from memory modules.

(b) Address registers which buffer the memory module addresses.

(c) Parity check and generating logic circuits which check parity of data received from memory modules and generate parity bits for data sent to memory modules.

(d) Timing and control circuits which control sequential operations required by the communications processes.

(e) Drivers 4–107, 4–313 which drive signal lines to the memory modules.

(f) Receivers 4–109, 4–311 which receive and standardize signals received from memory modules.

The communications unit in the memory modules 4–202 contain the necessary drivers 4–205, 4–207 and receivers 4–203, 4–209 to handle data received from and transmitted to the processor and I/O modules. Fifteen data transfer busses are provided in the system to interconnect the processor 4–101 and I/O modules 4–301 with the memory modules 4–201. Each bus has 52 parallel input data lines, 52 parallel output data lines and the necessary number of control lines.

Data transferred (through each bus) from a processor or I/O module to each memory module includes 51 data bits, one parity bit, one request strobe and one data strobe. Data transferred from the memory modules to a processor or I/O module include 51 data bits, one parity bit, one data strobe, one response signal, and one interrupt signal. In addition, a request signal is sent (over an individual line) from each I/O or processor module to each of the memory modules, and a processor interrupt signal is sent from each memory module to each processor module.

The central processor has a very comprehensive interrupt system, detecting 70 error and system control conditions. Upon interrupt or an ESP call, the central processor is transferred from User program control to ESP program control, i.e. from Normal mode (User mode) to control mode 1 (ESP mode). The central processor has three modes of operation: Normal mode, Control Mode 1 and Control mode 2 (the latter two are ESP modes). Normal mode has a restricted instruction set and a maximum number of allowable interrupts. The control modes have a complete instruction set and a minimum number of allowable interrupts. A control mode program can attempt to determine the cause of a normal mode interrupt by minimizing the possibility of further interrupt. During the processing of a User or worker type program in Normal mode the interrupt conditions that are allowed to interrupt the User's execution are restricted by the ESP. This is accomplished by controlling the content of the User's interrupt mask register.

Each time an allowable interrupt occurs and the processor is placed in a control mode, entries must be made describing the temporarily suspended program structure. These entries are made in a pair of storage tables contained in the storage area of the data processing system. They are called the Hot Job Tables and the Sleep Tables. A Hot Job Table is an array containing the information necessary for initialization or reinitialization of a program which has been introduced to the system and is scheduled to run or has been suspended by the Executive Scheduling Program and will be resumed. A Sleep Table is also an array of information describing the exact processor status at the time of suspension of the Executive Scheduling Program.

A Hot Job Table entry is made upon transfer of processing from a User program to ESP. The Hot Job Table contains three sections: start, control and accounting, and state. For each interrupt the state section contains a record of the central processor's registers at the time of interrupt and a status indication of the reason this User structure has been suspended.

The sleep table entry is allotted at the same time space is allocated for the rest of the program structure. A sleep table entry is one created upon the temporary suspension of an ESP process and contains all of the values required to resume the suspended ESP process. There is at least one sleep table space assigned to each HJT. One sleep table entry is made for each ESP process that is waiting to be resumed. Each sleep table entry contains a status field indicating whether it is ready to run, whether it is waiting for an I/O operation, etc. Each sleep table entry is linked to its corresponding HJT, and to subsequent sleep entries if any; otherwise it is marked as the last sleep table entry in the chain connected to the HJT. Sleep table entries are also linked to all other sleep table entries in order to facilitate scanning.

FIG. 5 illustrates the interrupt flow of control. That is, it indicates the path followed after the data processing system has been interrupted while executing a User program, i.e. operating in the Normal Mode. It should be noted that the shift from Normal Mode 5–10 to Control mode 1 program 5–16 also involves a shift by the interrupt executive control 5–14 via the interrupt logic 5–12. It should also be noted that as previously mentioned there is not a direct control path between the ESP control mode 1 programs and the external ESP which is operative in the normal mode 5–18.

After entering control mode 1, 5–16, a processor may be interrupted regardless of the mask register setting: by computer no-access-to-memory condition, computer parity error, stop instruction, etc. An interrupt occurring during control mode 1 will cause a processor to enter control mode 2, 5–24. The occurrence of any of the above interrupt conditions while in control mode 2 will cause the processor to halt 5–28.

HARDWARE FUNCTIONS AT INTERRUPT

The transfer from User program execution (Normal Mode) 5–10 to ESP interrupt service program execution (control mode 1) 5–16 is accomplished by the central processor logic 5–12, after all Instructions in the final instruction queue (FINQ) have been executed. The current base program register (BPR), program count register (PCR), ADVAST address register (AAR) and specific control flipflops are placed in the operand stack. The current value of the base interrupt register number 1 (BIAR1) is placed in BPR. The value of BIAR1 is determined by ESP (at the time the User structure is actuated) and designates the base address of the interrupt service routine. The program count register (PCR) is set to zeros. The next instruction to be executed is taken from the memory location indicated by BPR and PCR. The interrupt service routine will make a Hot Job Table entry into the HJT priority chain, test for the interrupt condition, and transfer control to the ESP subroutine indicated by the interrupt. Upon completion of interrupt service the HJT status field is set to "ready to run." The processor looks for something to do. It scans the sleep tables and the hot job tables and selects the program with the highest priority that is ready to run. At this time the loading of the processors is also evaluated to determine if more programs can be scheduled on the System.

MULTIPROCESSOR INTERRUPTS

The present data processing system is a multiprocessor system with all processors physically identical. There is no master-slave type relationship, therefore special care is taken to insure that not more than one processor will be interrupted by the same system control interrupt, i.e. I/O complete. This is accomplished by ESP controlling, for each processor the individual mask registers that determine which conditions are allowed to interrupt that processor. Also critical areas of the interrupt service routines of the ESP are "locked out" with software controls. For example, if two processors attempt to use the same "critical" interrupt service routine at the same time, the first processor will set a "lock" upon entrance to the routine, and the second processor, upon finding the routine locked, will be diverted to another function.

A flow diagram of the interrupt procedure is shown in FIG. 6. It illustrates the Central Processor Interrupt Routine Entry. The interrupt sequence begins with the setting of an $m$ bit in the Interrupt Condition Register (ICR$n$) 610. This corresponds to a particular interrupt, e.g. (Detected Interrupt Tag Memory Bounds Violation, etc.). If a corresponding $n$ bit in the Interrupt Mask Register (IMR$n$) 6–12 is set, the Interrupt Jump Register (IJR) 16 is set via gate 6–14 and the Central Processor will perform the hardware controlled interrupt logic sequence 6–18. This sequence 6–18 provides for the storing of basic information which is required for program resumption once the interrupt has been serviced. The registers which are stored in the FINST stack are the ADVAST Address Register (AAR), the Program Count Register (PCR), the Base Data Register (BDR) and the Control Flip-Flops (CCF). If the processor is in normal mode 6–20, the Base Interrupt Address Register 1 (BIAR1) which identifies the starting point of the interrupt processing procedure, is transferred to the cleared PCR 6–30. Control-mode-1 interrupt processing 6–32 is performed in this procedure, storing the contents of critical registers in the area previously referred to as the Hot Job Table (HJT). When the procedure progresses to the point which specifies a bit in the Interrupt Condition Register ICR, the specific procedure corresponding to the initiating interrupt condition is entered and interrupt processing is continued until completion, at which time it returns to the desired mode of the program 6–34.

An interrupt procedure at the control-mode-1 level 6–22 may encounter a transfer to a control-mode-2 interrupt level 6–28. If it is not in control mode 6–22, it will halt 6–24. The entry into Control Mode 2 or the more restricted interrupt procedure is enabled by conditions such as Parity Error, No Access to Memory and Stop. Interrupts pertaining to control-mode-2 result in the execution of another IRJ to the second level interrupt procedure which is defined by the Base Interrupt Address Register 2 (BIAR2) 6–26. The procedure directs the Central Processor through the noted sequences pertaining to the particular second level interrupt being serviced and carries the interrupt to completion, after which it returns to the desired program mode 6–34 as it did in Control Mode 1.

As previously mentioned, the Processor Module detects up to 70 interrupt conditions (such as memory bounds violation, a parity error, or an invalid operation). When an interrupt condition is detected, a bit assigned to designate that condition is set in the 70-bit interrupt condition register (ICR) in the Advanced Station portion of the Processor Module (ADVAST). However, the existence of an interrupt condition does not necessarily mean that the Processor Module is interrupted. Generally, the sensing and subsequent processing of an interrupt condition must be accomplished by permission from ESP to perform an interrupt process. This is accomplished by use of the 70-bit interrupt mask register (IMR). In general, ESP controls the IMR so that, when a bit in the ICR is set, a Processor Module Interrupt occurs only if the corresponding bit in the IMR is set and the Processor Module is in the normal mode of operation.

Interruption of a Processor Module is minimized by controlling the IMR during both user program processing and ESP processing. Interrupts serviced during ESP processing include equipment malfunction interrupts and tag bit interrupts that indicate the absence of ESP program segments. As an example, a tag bit interrupt condition occurs when a Processor Module must wait while an infrequently used program is called into main memory by ESP upon the detection of the tag bit.

IMR bits 69 and 70 are not used to mask interrupt conditions. They are used to facilitate tag filtering for computer stack extension and for transferring data through the communications unit of the Central Processor Module (COMM), and for transfers between the T register and the storage queue. When a mask bit is set, the tag is forced into a no operation (NOP) configuration for all words transferred along these paths. When a mask bit is reset, the tags pass unchanged.

The three modes, or levels of Processor Module operation (normal, control mode 1, and control mode 2) differ mainly in their susceptibility to interrupts. The normal mode is the most susceptible to interrupts. If the proper mask bits are set, an interrupt process causes a Processor Module to suspend its program operation and enter control mode 1. A user program has control over some of the interrupt conditions that it responds to (such as arithmetic overflow), but it must declare then to ESP. Other than the declared interrupts, ESP maintains control over the interrupts that are allowed to interrupt the Processor Module during the normal mode. The allowable interrupts depend on system conditions at the time of a program run.

Control mode 1 is the only mode in which a Processor Module can be started under program control and is the level at which ESP attains control from a user program and returns the control to the user program. All of ESP can operate in control mode 1 and occasionally operates in control mode 2 but most of the time ESP operates in normal mode. This is desirable so that ESP can react to presence bit tests and can respond rapidly to external operations in certain applications. However, when ESP is operating in normal mode, most of the mask bits are reset. In control mode 1 any valid instruction being executed upon the detection of certain maskable error conditions interrupts the Processor Module and places it in control mode 2.

Control mode 2 cannot be interrupted, except for the following conditions: no access to memory, a STOP instruction, a parity error from memory, or a nonexistent op code or variant. With the exception of the STOP interrupt, control mode 2 is identical to control mode 1 concerning its susceptibility to interrupts. Programs such as basic loaders, diagnostic routines, and system recovery routines are run at this level. ESP shifts the processor to control mode 2 upon detecting an equipment failure.

If one Processor Module returns to normal mode while another Processor Module of the Multiprocessor System is in control mode 1, a minimum of system interruptions is allowed (by control of the IMR) so that the Processor Module in control mode 1 can service all system interrupts. This prevents two Processor Modules from servicing the same interrupt. When all Processor Modules are in the normal mode, the interrupt mask register (IMR) is arranged so that no two Processor Modules are interrupted for the same system interrupt condition (such as service I/O complete).

Each Processor Module does, of course, service its own processor-dependent interrupts, such as incremental timer overflow, arithmetic overflow, parity errors, and memory bounds violations.

After it enters control mode 1, a Processor Module can be interrupted (regardless of the masksettings of its Interrupt Mask Register) as a result of an illegal variant, or Stop Instruction, a computer no-access-to-memory, or a computer parity error, etc. The occurrence of one of these conditions results in the interruption of a Processor Module and its entry into control mode 2. Because the condition may also be processor-dependent, it is processed by the individual Processor Module. If any of these conditions occur while the Processor Module is in control mode 2, the Processor Module halts all operations.

Depending on the type of interrupt, the op code of the instruction being processed by ADVAST may or may not be sent on to FINST. Some interrupts (such as bounds violations) inhibit FINST from executing its portion of the instruction (for example, SSM) until after the interrupt has been serviced.

The interrupt routine jump instruction (IRJ) is an automatic sequence that is initiated in response to any unmasked interrupt condition bit. During the execution of the interrupt routine jump instruction IRJ, the contents of the BPR, the PCR and AAR, the control flip-flops and the ICR are stored in the computer stack with the interrupt control flags being placed in the T register.

Specifically, the functions of the flags are:

(a) Bit 11 (SEX) indicates whether or not the stack was in extension mode at the time of the interrupt.

(b) Bit 12 (ABF) indicates if alternate bounds were in effect at the time of the interrupt.

(c) Bit 13 (RWF) indicates whether or not the alternate bounds segment was a read or write area (0=read, 1=write).

(d) Bit 14 (SRJ) indicates whether or not a subroutine jump was in process.

(e) Bit 15 (SSR) indicates whether or not a subroutine return was in process.

(f) Bits 16 (SC1) and 17(SC2) indicate the number of syllables involved in the last instruction executed before processing IRJ.

When the Processor Module is returned to normal mode through an IRR this number of syllables must be subtracted from the syllable count stored during the IRJ, if it is desired to repeat the last instruction.

(g) Bit 18 (TJ1) and bit 19 (TJ2) are related to SRJ and SSR only and indicate the type of jump or return that was being executed. The coding is as follows:

| TJ1 | TJ2 | Type |
| --- | --- | --- |
| 0 | 0 | Segment nonreturn. |
| 0 | 1 | Segment return. |
| 1 | 0 | Intra-segment return. |
| 1 | 1 | Procedure. |

The least significant 11 bits, but positions 20 through 30 are useful only in the defining of the type and cause of interrupts occurring during the execution of an SRJ or SRR instruction.

Bits 15 through 20 are stored as control information on IRJ but are not restored on IRR. These bits are simply an aid to the program interrupt processing. A Processor Module is returned to normal mode from control mode 1 by the execution of an interrupt routine return (IRR) instruction. A Processor Module also is returned to control mode 1 from control mode 2 by the execution of the IRR instruction. During the execution of an IRR instruction, the registers ARR, PCR and BPR are restored from the values stored in the computer stack during the execution of an interrupt routine jump (IRJ) instruction.

Execution of an IRR instruction returns the Processor Module to normal mode and to the processing of an object program from control mode 1. Execution of an IRR in control mode 2 returns the Processor Module to control mode 1. It is possible for a processor to return to the normal mode and not return to an object program. This is accomplished through the execution of a Store Stack to Register (SSR) instruction that resets the control mode bit 67 or 68 of the Interrupt Mask Register (IMR).

The interrupt servicing of memory associated errors, such as parity error and no-access-to-memory is aided by the use of the processor fail register (PFR) 2–315 of FIG. 2 and the memory fail register (MFR) 3–12 of FIG. 3. The content of the processor fail register (PFR) can be brought to the T register by means of the fetch register to stack (FRS) variants. The content of MFR can be brought to the T register by means of a special variant of the fetch memory to stack (FMS) instruction.

FIGS. 2–22 illustrates the format of the processor fail register (PFR). The PFR is loaded only in the event of an interrupt associated with a memory reference that will cause the initiation of an IRJ sequence.

TABLE 1.—INTERRUPT CONDITIONS

| Bit position in ICR/IMR | Bit position in computer stack | Interrupt condition | |
|---|---|---|---|
| 1 | 14 | Memory Module 1 error | |
| 2 | 15 | Memory Module 2 error | |
| 3 | 16 | Memory Module 3 error | |
| 4 | 17 | Memory Module 4 error | |
| 5 | 18 | Memory Module 5 error | |
| 6 | 19 | Memory Module 6 error | |
| 7 | 20 | Memory Module 7 error | |
| 8 | 21 | Memory Module 8 error | Memory Fail Registers in Memory Modules define type of error. |
| 9 | 22 | Memory Module 9 error | |
| 10 | 23 | Memory Module 10 error | |
| 11 | 24 | Memory Module 11 error | |
| 12 | 25 | Memory Module 12 error | |
| 13 | 26 | Memory Module 13 error | |
| 14 | 27 | Memory Module 14 error | |
| 15 | 28 | Memory Module 15 error | |
| 16 | 29 | Memory Module 16 error | |
| 17 | 30 | I/O Module 1 complete | T Register |
| 18 | 31 | I/O Module 1 error | |
| 19 | 32 | Interrupt by Processor Module 1 | External interrupts from I/O and Processor Modules. |
| 20 | 33 | I/O Module 2 complete | |
| 21 | 34 | I/O Module 2 error | |
| 22 | 35 | Interrupt by Processor Module 2 | |
| 23 | 36 | Interrupt by Operator's Console. | |
| 24 | 37 | | |
| 25 | 38 | | |
| 26 | 39 | | |
| 27 | 40 | | |
| 28 | 41 | External spares for system expansion. | |
| 29 | 42 | | |
| 30 | 43 | | |
| 31 | 44 | | |
| 32 | 45 | | |
| 33 | 46 | 1/16=sec. | External real time clock source. |
| 34 | 47 | 1 sec. | |
| 35 | 48 | 10 sec. | |
| 36 | 14 | PRT | |
| 37 | 15 | Normal | |
| 38 | 16 | Alternate | Bounds Violations. |
| 39 | 17 | Stack | |
| 40 | 18 | Spare. | |
| 41 | 19 | Incremental time overflow. | |
| 42 | 20 | Spare. | |
| 43 | 21 | Exponent underflow | |
| 44 | 22 | Exponent overflow | |
| 45 | 23 | Mantissa underflow | Arithmetic errors. |
| 46 | 24 | Mantissa overflow | |
| 47 | 25 | Normalized operand | |
| 48 | 26 | Divide by zero | |
| 49 | 27 | Spare. | S Register |
| 50 | 28 | Spare. | |
| 51 | 29 | Spare. | |
| 52 | 30 | SSM/SSMA to "read only" alternate bounds area. | |
| 53 | 31 | SSM PRT relative. | |
| 54 | 32 | FRS/SSR to class A registers. | |
| 55 | 33 | FRS to class B registers. | |
| 56 | 34 | SSR to class B registers. | |
| 57 | 35 | FRS to class C registers. | |
| 58 | 36 | Spare. | |
| 59 | 37 | Invalid tags. | |
| 60 | 38 | Interrupt tag bit set. | |
| 61 | 39 | No access to memory. | |
| 62 | 40 | Parity error from memory. | |
| 63 | 41 | Stop instruction. | |
| 64 | 42 | Nonexistent op code or variant. | |
| 65 | 43 | Invalid instruction—ICN, FMT, IOP, or ITB. | |
| 66 | 44 | AAR was reset. | |
| 67 (CM1) [1] | 45 | SSR class C is invalid in normal mode—Mask is CM1 or CM2. | |
| 68 (CM2) [1] | 46 | IRR invalid in normal mode—Mask is CM1 or CM2. | |
| 69 [2] | 47 | Force tags to zero on data from T to STORQ. | |
| 70 [2] | 48 | Force tags to zero on data to and from stack bottom. | |

[1] There are actually no mask bits for interrupt conditions 67 and 68. The control mode flags act as masks for these interrupts.
[2] There are no actual interrupt conditions associated with mask bits 69 and 70 (STORQ mask, and STACK mask). These bits and the control mode bits CM1 and CM2 are loaded with the remainder of IMR.

Table 1 lists the interrupt conditions recognized in the present data processing system. The first column of the table lists the corresponding Interrupt Condition Register (ICR) and Interrupt Mask Register (IMR) bit positions, assigned to the various interrupt conditions. The second column lists the corresponding FINST T and S register bit locations to which ICR or IMR contents are transferred during the execution of an FRS instruction. Bit locations 14 to 48 of the T and S registers receive bits 1–35 and 36 to 70 respectively of the ICR or IMR registers. This formatting is required before an SSR instruction can be executed to load the IMR. The use of the SSR instruction to load IMR and ICR is restricted by the fact that it is only possible if the Processor Module is in a control mode. The sampling of the ICR is possible and valid during both control and normal modes if the ICR is properly masked. The ICR is reset if it is sampled during a control mode, but is not reset if an FRS initiated transfer of ICR is performed during the normal mode.

As shown in Table 1 interrupt bits 1 through 16 are the memory error flags assigned to the Memory Modules in the system. When a Memory Module detects wrong parity on an incoming control word or on incoming or outgoing data transfers, it sets the correspondingly numbered memory error interrupt bit in ICR. Because a Memory Module does not correct wrong parity on outgoing data, the module receiving that data should also recognize the error.

Each Memory Module contains a Memory Fail Register (MFR) which defines the types of memory error conditions. A special variant of the FMS instruction allows the Processor Module to transfer the contents of MFR into the computer stack for purposes of error analysis. Interrupt bits 17 through 22 are set by external interrupts from I/O Modules or other Processor Modules. An I/O complete interrupt is a non-error type of interrupt which indicates that an I/O Module has completed a particular job. An I/O error interrupt signals ESP that there is an error condition in an I/O Module. A fail register (CFL) in each I/O Module provides further information about I/O Module errors.

The Processor Fail Register is a 26 bit register having the following format. Bits 19 through 24, respectively, indicate what particular unit within the Processor Module was involved in the error. The bit-to-unit correspondence is as follows:

PLI—Index/PRT Q—Single-word store only
PLA—ADVAST—Single-word fetch or store
PLT—Temp Q—Single-word fetch only
PLQ—Storage queue—Single-word store only
PLS—Stack—Four-word fetch or four-word store
PLL—Instruction Look Ahead—Four-word fetch only Bit 25, if set, indicates that the reference was a store; the result condition indicates a fetch. Bit 26 indicates detection of an invalid tag or an interrupt tag on an ILA fetch.

The PFR is cleared when it is sampled in a control mode; however, it remains unchanged when it is sampled in the normal mode.

When a Processor Module executes an Interrupt Computer "N" (ICN) instruction (see FIG. 11 for ADVAST flow diagram) the corresponding interrupt bit assigned (19 or 22) to that Processor is set in the ICR of the interrupted Processor Module. If a Processor Module is in control mode 1 and operating it ignores an interrupt regardless of the mask setting. If a Processor Module is in control mode 2 the interrupt is also ignored. However, if a Processor is stopped in control mode 1 and a HALT flag 1 is set, the interrupt condition causes that Processor to restart. Table 2 lists the normal mode response to interrupt conditions.

TABLE 2.—PROCESSOR MODULE RESPONSE TO INTERRUPT CONDITIONS

| Interrupt conditions | ICR/IMR Bits | Mask (1=S; 0=R) | Mode (1=C; 0=N) | CCI? | PI? | Set ICR Bit? |
|---|---|---|---|---|---|---|
| Memory Module errors 1-16 | 1-16 | 0 | 1 | Yes | No | Yes |
|  |  | 1 | 1 | Yes | No | Yes |
|  |  | 0 | 0 | Yes | No | Yes |
|  |  | 1 | 0 | Yes | Yes | Yes |
| I/O Module 1 complete | 17 | 0 | 1 | Yes | No | Yes |
|  |  | 1 | 1 | Yes | No | Yes |
| I/O Module 2 complete | 20 | 0 | 0 | Yes | No | Yes |
|  |  | 1 | 0 | Yes | Yes | Yes |
| I/O Module 1 error | 18 | 0 | 1 | Yes | No | Yes |
|  |  | 1 | 1 | Yes | No | Yes |
| I/O Module 2 error | 21 | 0 | 0 | Yes | No | Yes |
|  |  | 1 | 0 | Yes | Yes | Yes |
| Interrupt by Processor Module 1 | 19 | 0 | 1 | (¹) | (¹) | Yes |
|  |  | 1 | 1 | (¹) | (¹) | Yes |
| Interrupt by Processor Module 2 | 22 | 0 | 0 | Yes | No | Yes |
|  |  | 1 | 0 | Yes | Yes | Yes |
| PRT bounds violation | 36 | 0 | 1 | Yes | No | Yes |
|  |  | 1 | 1 | Yes | No | Yes |
|  |  | 0 | 0 | Yes | No | Yes |
|  |  | 1 | 0 | No | Yes | Yes |
| Normal bounds violation | 37 | 0 | 1 | Yes | No | Yes |
|  |  | 1 | 1 | Yes | No | Yes |
|  |  | 0 | 0 | Yes | No | Yes |
|  |  | 1 | 0 | No | Yes | Yes |
| Alternate bounds violation | 38 | 0 | 1 | Yes | No | Yes |
|  |  | 1 | 1 | Yes | No | Yes |
|  |  | 0 | 0 | Yes | No | Yes |
|  |  | 1 | 0 | No | Yes | Yes |
| Stack bounds violation | 39 | 0 | 1 | Yes | No | Yes |
|  |  | 1 | 1 | Yes | No | Yes |
|  |  | 0 | 0 | Yes | No | Yes |
|  |  | 1 | 0 | (²) | Yes | Yes |
| Incremental timer overflow | 41 | 0 | 1 | Yes | No | Yes |
|  |  | 1 | 1 | Yes | No | Yes |
|  |  | 0 | 0 | Yes | No | Yes |
|  |  | 1 | 0 | Yes | Yes | Yes |
| Exponent underflow | 43 | 0 | 1 | Yes | No | Yes |
| Exponent overflow | 44 | 1 | 1 | Yes | No | Yes |
| Mantissa underflow | 45 |  |  |  |  |  |
| Mantissa overflow | 46 | 0 | 0 | Yes | No | Yes |
| Non-normalized operand | 47 | 1 | 0 | (²) | Yes | Yes |
| Divide by zero | 48 |  |  |  |  |  |
| SSM/SSMA to a "read only" alternate bounds area | 52 | 0 | 1 | Yes | No | Yes |
|  |  | 1 | 1 | Yes | No | Yes |
|  |  | 0 | 0 | Yes | No | Yes |
|  |  | 1 | 0 | No | Yes | Yes |
| SSM-PRT relative | 53 | 0 | 1 | Yes | No | Yes |
|  |  | 1 | 1 | Yes | No | Yes |
|  |  | 0 | 0 | Yes | No | Yes |
|  |  | 1 | 0 | No | Yes | Yes |
| FRS/SSR to class A registers | 54 | 0 | 1 | Yes | No | Yes |
|  |  | 1 | 1 | Yes | No | Yes |
|  |  | 0 | 0 | Yes | No | Yes |
|  |  | 1 | 0 | No | Yes | Yes |
| FRS to class B registers | 55 | 0 | 1 | Yes | No | No |
|  |  | 1 | 1 | Yes | No | Yes |
|  |  | 0 | 0 | Yes | No | Yes |
|  |  | 1 | 0 | No | Yes | Yes |
| SSR to class B registers | 56 | 0 | 1 | Yes | No | Yes |
|  |  | 1 | 1 | Yes | No | Yes |
|  |  | 0 | 0 | Yes | No | Yes |
|  |  | 1 | 0 | No | Yes | Yes |
| FRS to class C registers | 57 | 0 | 1 | Yes | No | Yes |
|  |  | 1 | 1 | Yes | No | Yes |
|  |  | 0 | 0 | Yes | No | Yes |
|  |  | 1 | 0 | No | Yes | Yes |

TABLE 2.—Processor Module Response To Interrupt Conditions—Continued

| Interrupt conditions | ICR/IMR Bits | Mask (1=S; 0=R) | Mode (1=C; 0=N) | CCI? | PI? | Set ICR Bit? |
|---|---|---|---|---|---|---|
| Invalid Tags | 59 | 0 | 1 | (³) | (³) | Yes. |
|  |  | 1 | 1 | (³) | (³) | Yes. |
|  |  | 0 | 0 | (³) | (³) | Yes. |
|  |  | 1 | 0 | (³) | (³) | Yes. |
| Interrupt Tags | 60 | 0 | 1 | (³) | (³) | Yes. |
|  |  | 1 | 1 | (³) | (³) | Yes. |
|  |  | 0 | 0 | (³) | (³) | Yes. |
|  |  | 1 | 0 | (³) | (³) | Yes. |
| No-Access-to-Memory | 61 | 0 | 1 | (³) | (³) | Yes. |
|  |  | 1 | 1 | (³) | (³) | Yes. |
|  |  | 0 | 0 | (³) | (³) | Yes. |
|  |  | 1 | 0 | (³) | (³) | Yes. |
| Parity Error from Memory | 62 | 0 | 1 | (³) | (³) | Yes. |
|  |  | 1 | 1 | (³) | (³) | Yes. |
|  |  | 0 | 0 | (³) | (³) | Yes. |
|  |  | 1 | 0 | (³) | (³) | Yes. |
| Stop Instruction | 63 | 0 | 1 | (³) | Halt | Yes. |
|  |  | 1 | 1 | (³) | (⁴) | Yes. |
|  |  | 0 | 0 | (³) | Stop | Yes. |
|  |  | 1 | 0 | (³) | Yes | Yes. |
| Nonexistent Op code or Variant | 64 | 0 | 1 |  | Yes | Yes. |
|  |  | 1 | 1 |  | Yes | Yes. |
|  |  | 0 | 0 |  | No | Yes. |
| Illegal instructions, ICN, FMT, IOP, ITB | 65 | 0 | 1 | Yes | No | Yes. |
|  |  | 1 | 1 | Yes | No | Yes. |
|  |  | 0 | 0 | Yes | No | Yes. |
|  |  | 1 | 0 | No | Yes | Yes. |
| ADVAST address register reset | 66 | 0 | 1 | Yes | No | Yes. |
|  |  | 1 | 1 | Yes | No | Yes. |
|  |  | 0 | 0 | Yes | No | Yes. |
|  |  | 1 | 0 | Yes | Yes | Yes. |
| SSR to class C | ⁵67 | 0 | 1 | Yes | No | Yes. |
|  |  | (⁵) | 1 | Yes | No | Yes. |
|  |  | 0 | 0 | No | Yes | Yes. |
|  |  | (⁵) | 0 | No | Yes | Yes. |
| Interrupt Routine Return | ⁶68 | 0 | 1 | Yes | No | Yes. |
|  |  | (⁶) | 1 | Yes | No | Yes. |
|  |  | 0 | 0 | No | Yes | Yes. |
|  |  | (⁶) | 0 | No | Yes | Yes. |

¹ If the Processor Module is halted in control mode 1, ICN effects a restart; otherwise the execution of the instruction is completed, and the interrupt is not processed.
² Current instruction and all instructions in FINQ are executed before ESP takes control.
³ Refer to Table 3. STOP is simply the setting of the condition bit.
⁴ If CM1→Go to CM2; If CM2→STOP.
⁵ SSR to class C registers is invalid except in Control Mode 1 or 2; there is no actual mask.
⁶ IRR is invalid except in control Mode 1 or 2; there is no actual mask.

ICR23 is assigned to the Operator's Console and is treated as an I/O complete interrupt. ICR24 through ICR32 are allocated as spares and are wired to receivers in the Processor Module to accommodate external interrupts in an expanded system. ICR33, 34 and 35 are assigned to the external real time clock.

Interrupt bits 36 through 39 and 43 through 48 are used to indicate bounds violations and arithmetic errors, respectively.

Interrupt bit 41 is set when an incremental time counter (ITC) overflow is detected. The ITC is a 32 bit counter having the following format. Bits 1 through 18 form the programmable portion of ITC which is incremented on overflow from the free-running counter every 0.8192 millisecond, while bits 19 through 32 of ITC form a free-running counter that is incremented at a 20 megacycle clock rate. Thus the maximum time necessary for the entire ITC (bits 1–32) to overflow is 3.579 minutes. However bits 1 through 17 can be present to a given value by use of the SSR instruction. Bits 1 through 32 of the ITC may be sampled during the execution of an FRS instruction, and if the FRS instruction is executed in a control mode, bits 1 through 32 are automatically cleared (reset). ITC can also be sampled during the normal mode; however, the count in bits 1 through 32 is not reset.

Because all ITC bits are sampled by FRS but only 17 bits are loaded by SSR, an FRS/SSR executed routine that does not run longer than 0.8192 millisecond can be completed without missing a count. Because the ITC is initiated in free-running condition, undesirable interrupts are possible. Thus mask bit IMR 41 should be reset to inhibit an ITC interrupt.

Interrupt bits 59, 64, and 68 are used to indicate invalid and nonexistent instructions, variants and tags. Nonexistent instructions are processed as NOP instructions.

The following octal instruction codes are not used and are treated as invalid instructions: 15, 37, 47, 54 and 64. The appearance of any one of these operation (op) codes in the instruction string sets interrupt bit 64.

The occurrence of a nonexistent variant configuration will also set interrupt bit 64. These variants are as follows:

| VARIANT: | OCTAL CODE |
|---|---|
| BASE (B) | X5, X6 and X7. |
| CP NO. (N) | 00, 20, 40 and 60. |
| I/O NO. (T) | 00, 20, 40, 60, 17, 37, 57 and 77. |
| REGISTER (R) | 0X, 1X, 35, 36, 43, 44, 45, 46, 47, 5X, 60, 70, 71, 73, 74, and 75. |
| CONVERT (Vc) | X1 and X5. |

Note: "X" indicates any octal digit from 0 through 7.

Bit 65 indicates interrupts for maskable invalid instructions ICN, FMT, IOP, and ITB.

Interrupt bits 54, 55, 56 and 77 are used to indicate the use of invalid register variants (R) by FRS or SSR instructions. Table 3 lists the variant codes which if not properly masked are recognized as invalid variants. The register variants are grouped into three categories: (1) class A registers, which are for general program use, (2) class B registers which are utilized by ESP, and (3) class C registers which are utilized in interrupt processing.

TABLE 3.—INVALID REGISTER VARIANTS

| Class | Register | Octal code |
|---|---|---|
| Class A reigsters | BSR | 40 |
|  | PCR | 41 |
|  | JCR | 42 |
| Class B registers | SEP | 20 |
|  | BXR | 21 |
|  | BPR | 22 |
|  | BDR | 23 |
|  | NLBR | 24 |
|  | NUBR | 25 |
|  | ALBR | 26 |
|  | PCS | ¹30 |
|  | SLBR | 31 |
|  | SUBR | 32 |
|  | PRT | 33 |
|  | PRTL | 34 |
|  | CNR | ¹37 |
| Class C registers | BIAR1 | 61 |
|  | BIAR2 | 62 |
|  | PFR | 63 |
|  | AMAR | 64 |
|  | ITC | 65 |
|  | IMR | 76 |
|  | ICR | 77 |

¹ Nonexistent variant for SSR.

IMR mask bit 54 is used to mask invalid variant codes of class A registers addressed by both FRS and SSR instructions, IMR bit 55 is used to mask invalid variant codes of class B registers addressed by an FRS instruction, IMR bit 55 is used to mask invalid variant codes of class B registers addressed by an SSR instruction, and IMR bit 56 is used to mask invalid variant codes of class C registers addressed by an FRS instruction. Control mode flag 1 or 2 (ICR bits 67 and 68) are used to mask invalid variant codes of class C registers addressed by an SSR instruction.

Interrupt bit 59 indicates the use of invalid tags. The following is a list of memory references which are susceptible to invalid tag interrupts, along with a list of corresponding valid tag configurations. Interrupt bit 60 indicates the setting of an interrupt tag bit, and, if it is unmasked, the interrupt is unconditionally processed.

| MEMORY REFERENCE: | VALID TAG |
|---|---|
| FMA to alternate bounds area | All tags except jump. |
| FMC to alternate bounds area | All tags except jump. |
| Fetch of JCW during SRJ | Jump only. |
| Fetch of RCW during SRJ or SSR | Indirect jump. |
| Fetch of called procedures PRTL during SRJ | NOP only. |
| Fetch of called PRT/PRTL during SRJ | Alternate bounds only. |
| Normal fetch of program through ILA | NOP only. |

A stop instruction interrupt, which is indicated by interrupt bit 63 is treated differently to provide a program-controlled normal mode halt. When the Processor Module is in the normal mode and mask bit 63 is reset, the execution of a Stop Instruction results in a program halt without entry into an interrupt routine jump sequence. (Table 2 describes results effected by other mode and mask configurations.)

Interrupt bit 66 is set whenever the ADVAST address register (AAR) is reset. There are instances when it is not desirable to service interrupts if AAR contains an absolute address. The servicing of an interrupt will not begin until ICR bit 66 is set, and operation is returned to the execution of the object program until AAR is cleared.

Referring again to Table 2, it lists the action taken by a Processor Module in response to the various interrupt conditions. The actions specified in the "Process Interrupt" column vary in accordance with the mode of operation in effect. A "1" in Table 2 indicated during the normal mode specifies a change to control mode 1. If the operation is in control mode 1, a "1" specifies a change to control mode 2. If the Processor Module is already in control mode 2, a "1" specifies a halt.

No-access-to-memory, parity errors and tag interrupts are considered critical error interrupts. Table 4 lists the instructions and functions that are susceptible to these critical interrupts and the corresponding action for all mask and mode configurations.

TABLE 4.—CRITICAL ERROR INTERRUPTS

| Critical error interrupt | Susceptible instructions or functions | Actions |
|---|---|---|
| No-access-to-memory | FMS<br>FMSA<br>FMT; FMC (second fetch) | 1. Put 0's into TEMPO.<br>2. Execute the instruction involved.<br>3. Complete the instruction currently in ADVAST.<br>4. If control mode 1 is in effect, execute IRJ sequence.<br>5. If control mode 2 is in effect, stop operation.<br>6. If normal mode is in effect and mask bit is set, execute IRJ sequence.<br>7. If normal mode is in effect and mask bit is not set, continue the process in sequence. |
|  | X; XM<br>FMA; FMC (first fetch)<br>JXMT | 1. Discontinue execution of instruction involved.<br>2. If control mode 1 is in effect, execute IRJ sequence.<br>3. If control mode 2 is in effect, stop.<br>4. If normal mode is in effect and mask bit is set, execute IRJ sequence.<br>5. If normal mode is in effect and mask bit is not set, stop. |
|  | SSM<br>SSMA | 1. Erase word (in STORQ) causing interrupt.<br>2. Execute current SSM or SSMA instruction.<br>3. If control mode 1 is in effect, execute an IRJ sequence.<br>4. If control mode 2 is in effect, stop.<br>5. If normal mode is in effect and mask bit is set, execute IRJ sequence.<br>6. If normal mode is in effect and mask bit is not set, continue in sequence. |
|  | SRJ (fetch)<br>SRR (fetch) | 1. Discontinue instruction involved.<br>2. If control mode 1 is in effect, execute IRJ sequence.<br>3. If control mode 2 is in effect, stop.<br>4. If normal mode is in effect and mask bit is set, execute IRJ sequence.<br>5. If normal mode is in effect and mask bit is not set, stop. |

TABLE 4.—CRITICAL ERROR INTERRUPTS—Continued

| Critical error interrupt | Susceptible instructions or functions | Actions |
|---|---|---|
| | SRJ (store)<br>SRR (store) | 1. Continue with instruction involved.<br>2. If control mode 1 is in effect, execute IRJ sequence<br>3. If control mode 2 is in effect, stop.<br>4. If normal mode is in effect, and mask bit is set, execute IRJ sequence.<br>5. If normal mode is in effect and mask bit is not set, stop. |
| | Program Fetch (ILA) | 1. Complete current instruction.<br>2. If control mode 1 is in effect execute IRJ sequence.<br>3. If control mode 2 is in effect, stop.<br>4. If normal mode is in effect and mask bit is set, execute IRJ sequence.<br>5. If normal mode is in effect and mask bit is not set, stop. |
| Parity error | FMS<br>FMSA<br>FMT; FMC (second fetch) | 1. Allow word with error into TEMPQ.<br>2. Execute the instruction involved.<br>3. Complete the instruction currently at ADVAST.<br>4. If control mode 1 is in effect, execute IRJ sequence.<br>5. If control mode 2 is in effect, stop.<br>6. If normal mode is in effect and mask bit is set, execute IRJ sequence.<br>7. If normal mode is in effect and mask bit is not set, continue in sequence. |
| | X;XM<br>FMA<br>FMC (first fetch); JXMT<br>SRJ; (fetches) SRR | 1. Do not allow parity error word in DESQ.<br>2. Discontinue the instruction involved.<br>3. If control mode 1 is in effect, execute IRJ sequence.<br>4. If control mode 2 is in effect, stop.<br>5. If normal mode is in effect and mask bit is set, execute IRJ sequence.<br>6. If normal mode is in effect and mask bit is not set, stop. |
| | Program fetch (ILA) | 1. Complete current instruction.<br>2. If control mode 1 is in effect, execute IRJ sequence.<br>3. If control mode 2 is in effect, stop.<br>4. If normal mode is in effect and mask bit is set, execute IRJ sequence.<br>5. If normal mode is in effect and mask bit is not set, stop. |
| Tag Interrupts | FMS<br>FMSA<br>FMT; FMC (second fetch)<br>X; SM<br>JXMT | 1. Allow word into TEMPQ.<br>2. Execute the instruction involved.<br>3. Complete the instruction currently at ADVAST.<br>4. If control mode 1 is in effect, continue in sequence.<br>5. If control mode 2 is in effect, continue in sequence.<br>6. If normal mode is in effect and mask bit is set, execute IRJ sequence.<br>7. If normal mode is in effect and mask bit is not set, continue in sequence. |
| | FMS<br>FMC (first fetch)<br>SRJ; SRR (fetches) | 1. Allow word into DESQ.<br>2. If control mode 1 is in effect, discontinue the instruction and execute IRJ.<br>3. If control mode 2 is in effect, discontinue the instruction and stop.<br>4. If normal mode is in effect and mask set, discontinue and instruction and execute IRJ.<br>5. If normal mode is in effect and mask is not set, stop. |
| | Program fetch (ILA) | 1. Continue in sequence until error word is at top of ILA.<br>2. If control mode 1 is in effect, execute IRJ.<br>3. If control mode 2 is in effect, stop.<br>4. If normal mode is in effect and mask set, execute IRJ.<br>5. If normal mode is in effect and mask not set, stop. |

Computer stack operations error interrupts are responded to as follows:

(a) A no-access-to-memory error interrupt causes the computer stack to be placed in the local mode, and the procedure described in Table 4 steps 2 through 7 for the FMS instruction is followed.

(b) A parity error tag interrupt allows the transfer of the error word into the computer stack; then the procedure described in Table 4 steps 2 through 7 for the FMS is followed.

Figure 7:
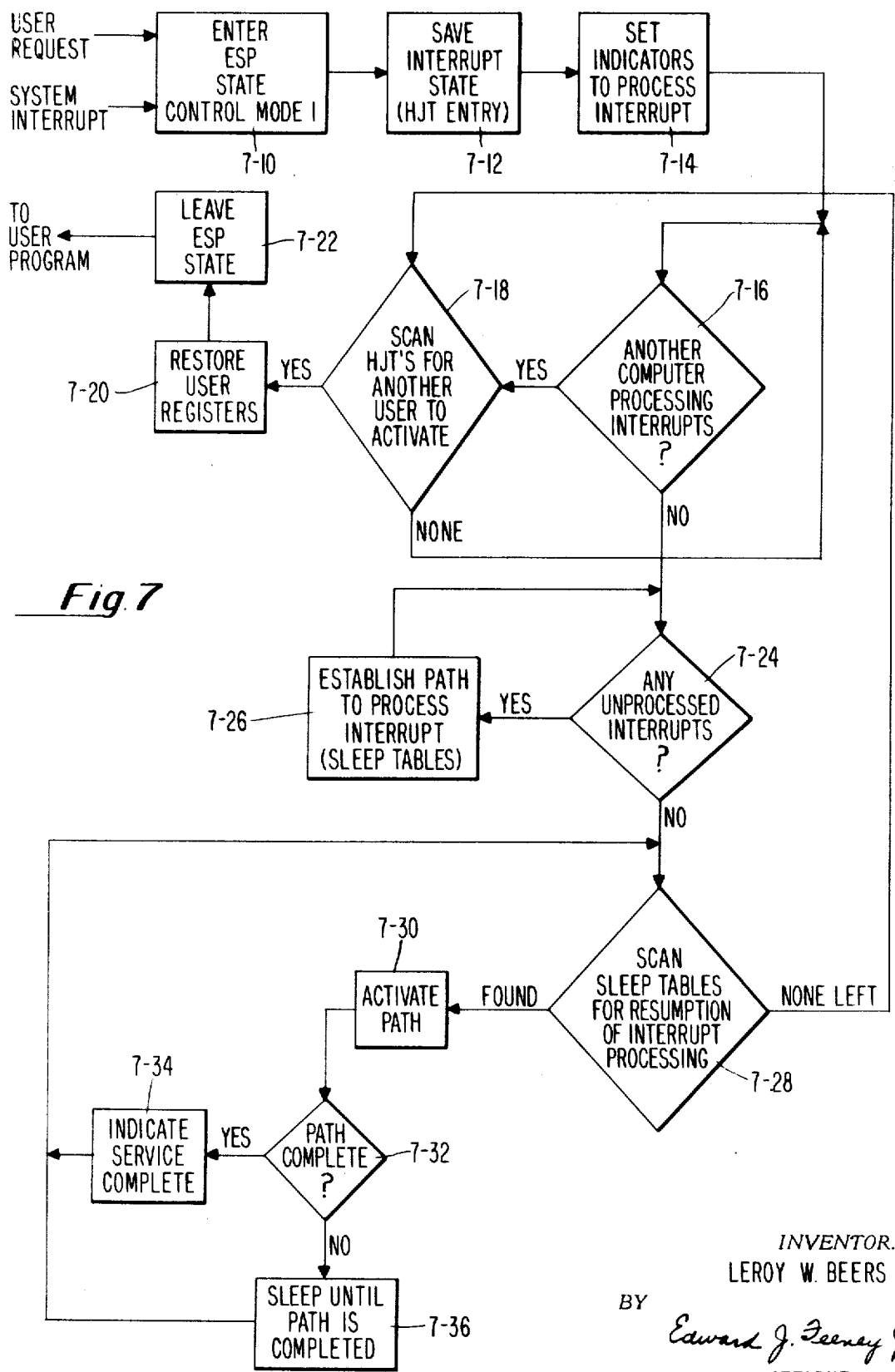
FIG. 7 is also a flowpath which shows the execution of interrupt processing.

Returning to the description of the figures, FIG. 7 illustrates a signal flow diagram during the execution of interrupt processing. First, note that either a user request or a system interrupt causes the processor to enter the ESP state in control mode 1, 7–10. Thereafter the state of the processor, i.e. the binary state of the active registers of the processor are saved by storing the information as entry in the Hot Job Table area of the memory 7–12. Next, the mask indicators are set to process the interrupt 7–14.

It must then be determined whether another computer is processing that interrupt 7–16 and if so the Hot Job Tables are scanned to determine whether another user is available for activation 7–18. If one is available, the user registers are restored 7–20 and the processor leaves the ESP state 7–22 to return to the available user program.

If another computer is not processing the interrupts 7–16, then it must be determined if any unprocessed interrupts are presently in existence 7–24 in the sleep tables in the memory. These are interrupts awaiting activation. If there are then these are taken care of first by establishing the path necessary for their processing 7–26. If no unprocessed interrupts are awaiting action, the sleep tables are scanned in search for interrupts 7–28. If none are found, the processor returns to the user program as previously mentioned via 7–18, 7–20, and 7–22. If some are found the paths are activated 7–30, completed 7–32 and so indicated 7–34. If the path is not completed the interrupt sleeps in the sleep table until the path is completed 7–36.

Figure 8:
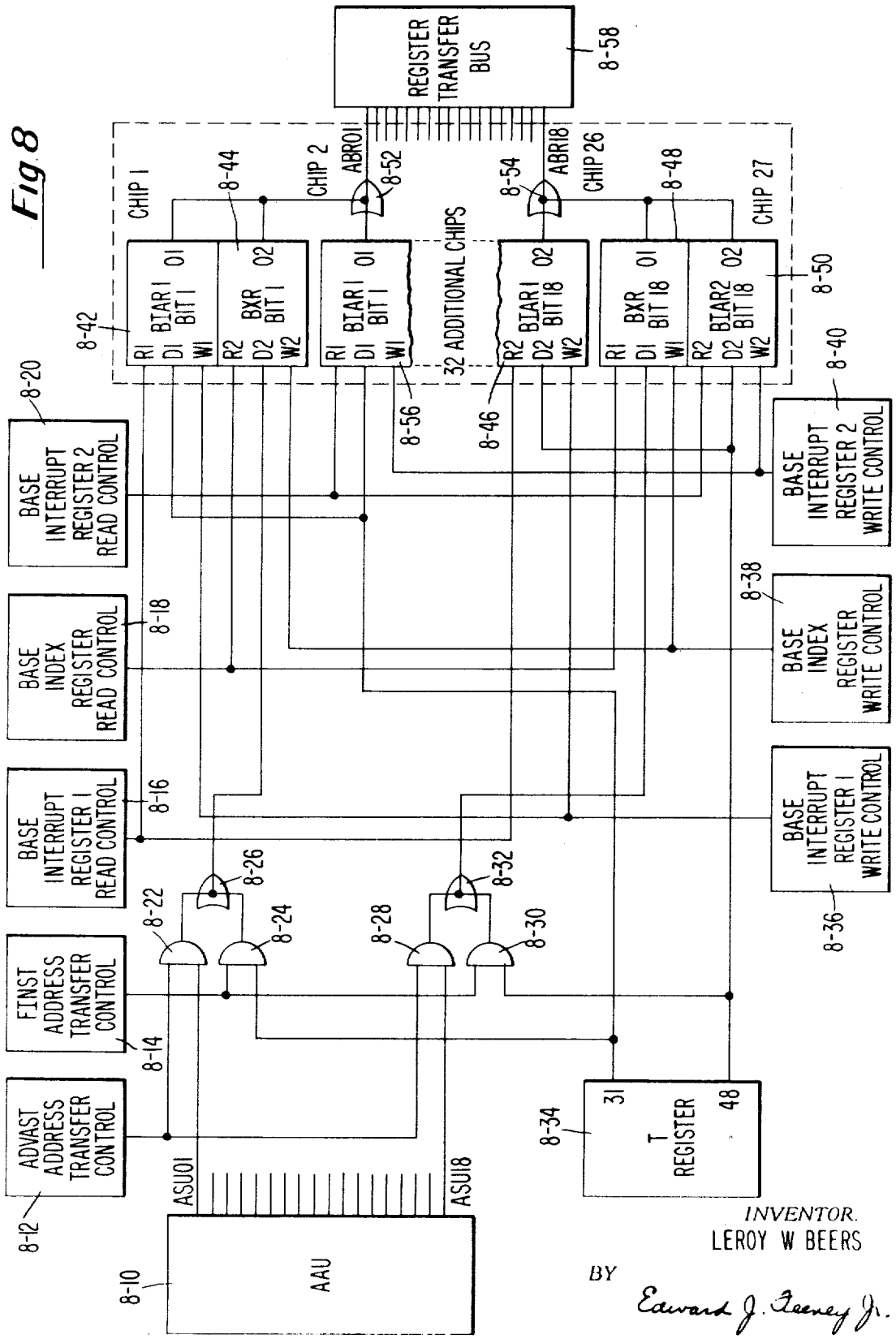
FIG. 8 is a simplified apparatus implementation of the Base Interrupt Address Registers 1 and 2 as well as the Base Index Register.

Next, consider FIG. 8 of the drawings. The base index register (BXR) is an 18-bit register (Bit 1 is referenced as 8–44 while bit 18 is noted as 8–48) that contains the address of the first word of a data area for an active program segment. Base interrupt address registers BIAR1 and BIAR2 are also 18-bit registers that contain the starting addresses of routines resulting from a normal mode interrupt and a control mode 1 interrupt, respectively. Bit 1 of BIAR1 is referenced as 8–42 and bit 18, 8–46 while bit 1 of BIAR2 is noted as 8–52 with bit 18 of BIAR2, 8–50.

A unique feature about the BXR and BIAR registers is that they share integrated circuit modules and common outputs in the three card locations: 1212, 1215, 1218, 8–60. FIG. 8 is a block schematic diagram showing how AAU outputs 8–10 (ASU01 through ASU18) are written into the BXR and how T register 8–34 contents (T31 through T48) are written into either BIAR1 or BIAR2. FIG. 8 also shows how the contents of BXR, BIAR1 or BIAR2 are read out of the storage modules for transfer through the register transfer bus.

The 18-bit BXR, BIAR1 and BIAR2 registers are implemented by the use of 27 circuit chips (CT L type 968) each of which provides for two bits of register storage. Each of three card locations contains nine chips. Bits 1 through 6 all three registers are stored in nine chips in the first location, bits 7 through 12 are stored in nine chips in the second location and bits 13 through 18 are stored in nine chips in the third location. As shown in FIG. 8 BXR, BIAR1 and BIAR2 share 18 common output circuits (wired OR's) 8–52, 8–54 designated ABRO1 through ABRO2. Each output handles one bit read from either BXR, BIAR1 or BIAR2. This ABRO1 represents an output read from bit location 1 (chips 1 and 2) of BIAR1, BXR or BIAR2, and ABR18 represents an output read from bit location 18 (chips 26 and 27) of BIAR1, BXR or BIAR2.

Figure 9:
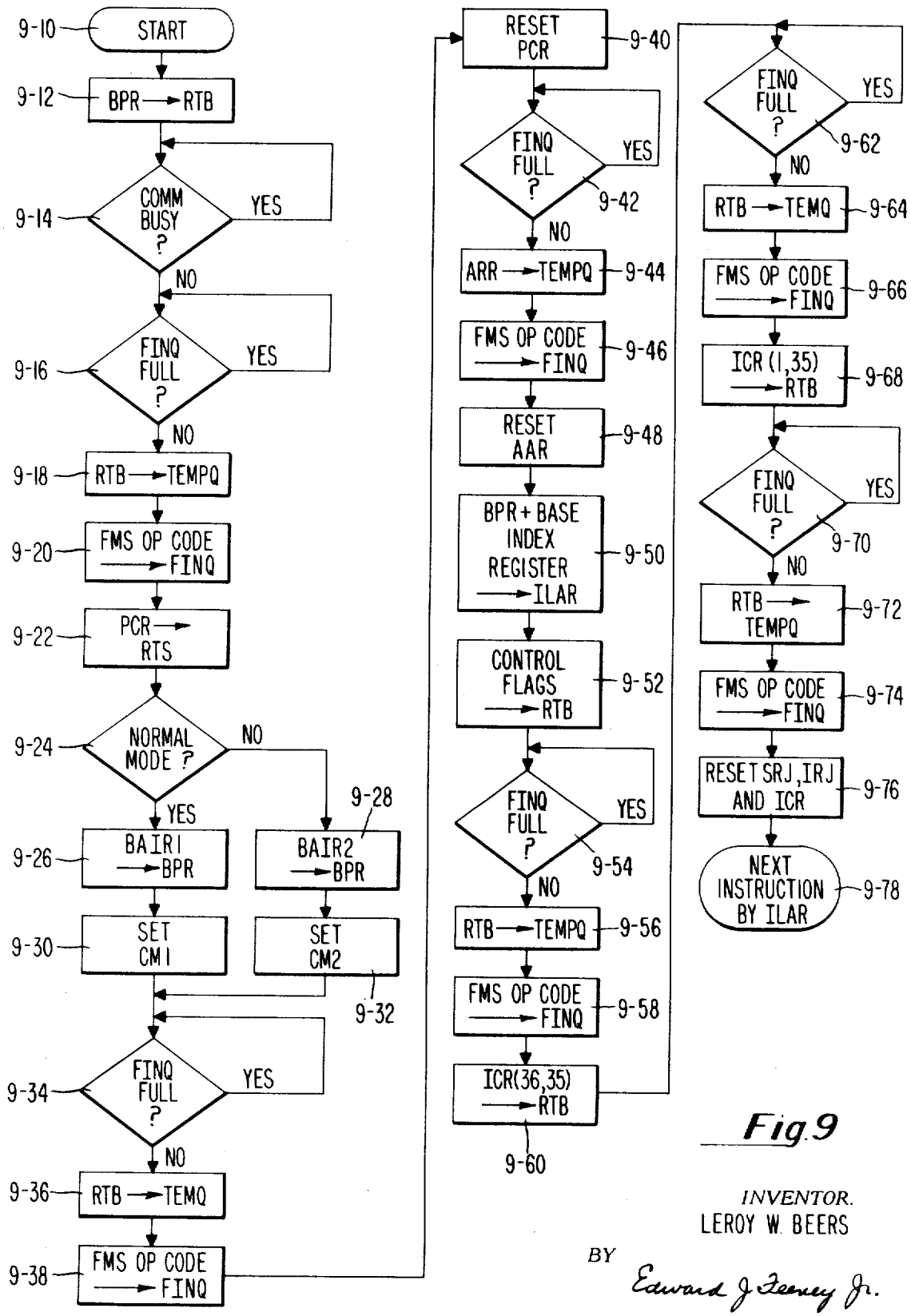
FIG. 9 is a signal flow diagram during an Interrupt Routine Jump instruction.

The routines performed by the Processor Module are automatically initiated when specified by temporary conditions which exist in the Processor Module. The interrupt routine jump (ORJ) is hardware controlled and is executed in the same manner each time. It is illustrated in FIG. 9. The sequence of the sub-routine jump (SRJ) depend on the configuration of a jump control word.

The interrupt routine jump (IRJ) is an automatic routine which is used to service a Processor Module interrupt. The IRJ stores the contents of the Interrupt Condition Register (ICR), the control flipflops, the ADVAST address register (ARR), the program count register (PCR) and the base program register (BPR) into the six top computer memory stack locations. (The 70-bit ICR configuration is placed in the T and S registers.) The data is stored in the stack by sequentially placing the contents of the registers in TEMPQ and the FMS op code in the final queue. After each transfer to TEMPQ and the final queue, the FMS op code instructs FINST to step down the entire computer stack and transfer the contents from TEMPQ to the T register. Also during the execution of this routine, the mode of the Processor Module is increased by 1. FIG. 9 is a flow diagram for the IRJ routine. Table 5 is a timing chart which lists the conditions and the resulting commands that occur during the execution of the IRJ routine.

This table is an ADVAST Timing Chart for the Interrupt Routine Jump (IRJ) flow diagram shown in FIG. 9.

TABLE 5

| Phase | Time | Conditions | Commands | Comments |
|---|---|---|---|---|
| | | | ABPAUE1_ | Enable BPR to AAU for entire routine. |
| | | | AARAUE0_ | Inhibit AAR to AAU for entire routine. |
| | | | AFMFQE1_ | Enable FMS op code to FINQ. |
| 3 | | CRMT-0—CRQT-0 | ATBTQE1_ | Enable RTB to TEMPQ except for PH3. |
| 1 | | | ABPTBE1_ | Enable BPR to RTB. |
| (1) | 1 | CRMT-1+CRQT-1+AFQFL-1. | AH0LDE1_ | |
| (1) | 2 | | ASBFQT1_ | Strobe FINQ·FMS op code→FINQ. |
| | | | AJPH2S1___ | Jump to phase 2. |
| | | | ASBTQT1_ | Strobe TEMPQ·BPR→TEMPQ. |
| 2 | | | APCTBE1_ | Place PCR on RTB. |
| (2) | 3 | ACM1-0.ACM2-0 | AB1BPT1_ | BIAR1→BPR. |
| | | | ACM1-S1___ | Enter control mode 1. |
| (2) | 3 | ACM1-1 | AB2BPT1_ | BIAR2→BPR. |
| | | | ACM2-S1___ | Enter control mode 2. |
| (2) | 4 | AFQFL-1 | AJT4-S1____ | Wait until FINQ is not full. |
| (2) | 4 | AFQFL-0 | ASBTQT1_ | PCR→TEMPQ. |
| | | | ASBFQT1_ | FMS op code→FINQ. |
| | | | APC-R1____ | Reset PCR. |
| | | | APC-R1____ | Reset PCR. |
| | | | AJPH3-S1_ | |
| 3 | | | AARTQE1 | AAR→TEMPQ. |
| (3) | 6 | AFQFL-0 | ASBTQT1_ | AAR→TEMPQ. |
| | | | ASBFQT1_ | |
| | | | AAR-R1____ | |
| 3 | 6 | AFQFL-0 | AJPH4S1___ | |
| (3) | 6 | AFQFL-1 | AH0LDE1_ | |
| 4 | | | ACFTBE1_ | Enable control flags to RTB. |
| (4) | 7 | | AAULRT1_ | AAU→ILAR. Address of ESP program. |
| | | | ALAPTR1_ | Reset ILA pointers. |
| (4) | 8 | AFQFL-0 | ASBTQT1_ | RTB→TEMPQ. |
| | | | ASBFQT1_ | |
| 4 | 8 | | AJPH5S1___ | |
| | | | AJT5-S1____ | |
| (4) | 8 | AFQFL-1 | AH0LDE1_ | |
| 5 | | | AC2TBE1_ | ICR (36, 35)→RTB. |
| (5) | 6 | AFQFL-1 | AH0LDE1_ | Implied by T6. |
| (5) | 6 | AFQFL-0 | ASBTQT1_ | Implied by T6. |
| | | | ASBFQT1_ | |
| 5 | 6 | AFQFL-0 | AJPH6S1___ | |
| 6 | | | AC1TBE1_ | |
| (6) | 8 | AFQFL-1 | AH0LDE1_ | Implied by T8. |
| (6) | 8 | AFQFL-0 | ASBTQT1_ | Implied by T8. |
| | | | ASBFQT1_ | |
| 6 | 8 | | AICR-R1__ | |
| 6 | 9 | | ABSIRT1__ | |
| | | | ASRJ-R1___ | |
| | | | AIRJ-R1___ | |

The routine may be started 9–10 at any phase or time a transfer of the FMS op code to the final queue is enabled. A transfer of the BPR contents 9–12 to the AAU is enabled and the automatic transfer of the AAR content to the AAU is inhibited. At any phase or time, except phase 3 (PH3), a transfer of the register transfer bus (RTB) contents of TEMPQ 9-18 is enabled if COMM is not busy 9-14 with TEMPQ.

At phase 2 (PH2) time 3 (T3) and if the Processor Module is in the normal mode 9-24, the control mode 1 flag (CM1) is set 9-30, and the contents of the base interrupt address register (BIAR1) are transferred to the BPR 9-26. However, if the Processor Module is in the control mode 1, then the control mode 2 flag (CM2) is set 9-32 and the contents of the base interrupt address register 2 (BIAR2) are transferred to the BPR 9-28. At time 4, the contents of the Program Count Register (PCR) are placed in TEMPQ via RTB, 9-36 and the PCR is reset 9-40.

At any time during PH3, a transfer of the AAR contents to TEMPQ is enabled 9-44, and the transfer is executed at time 6 (T6). At phase 4 (PH4) time 7 (T7) the contents of the AAU are transferred to the instruction look-ahead register (ILAR) 9-50. At time 8, the contents of the control flip-flops are placed in TEMPQ 9-56.

At any time of phase 5 (PH5) ICR bits 35 through 70, 9-60, 9-68 are placed in the RTB. At time 6 (T6) if the FINQ is not full 9-70 the contents of the RTB are transferred to TEMPQ 9-72, and at the same time the SRJ flag bit, the IRJ flag bit and the ICR register are reset 9076, ADVAST then prepares to execute the instruction addressed by ILAR 9-78.

Figure 10:
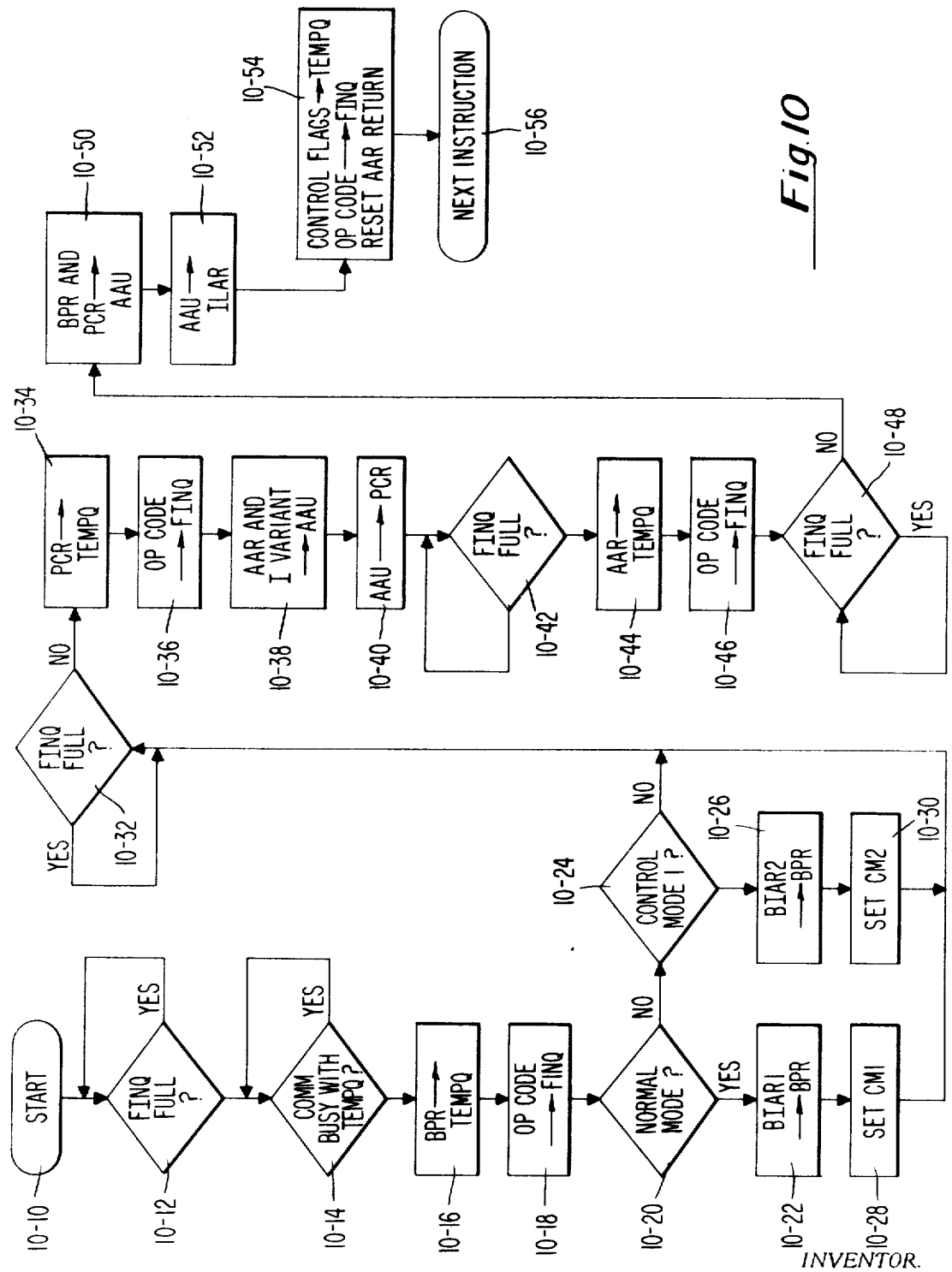
FIG. 10 is the signal flow diagram in the Advanced Station (ADVAST) portion of the Central Processor Module of FIG. 1 during the execution of the Enter Executive and Scheduling Program (ESP) instruction.

FIG. 10 is a flow diagram of the system during the execution of an Enter Executive and Scheduling Program Instruction. After starting 10-10, finding the Final Station Queue (FINQ) not full 10-12, and the Communication Station not busy with TEMQ 10-14 the contents of the Base Program Register (BPR) are transferred to the TEMQ 10-16 and the operation code is sent to FINQ 10-18. If the Processor Module is presently in the Normal Mode 10-20 the contents of the Base Interrupt Address Register 1 (BIAR1) are transferred to the Base Program Register (BPR) 10-22 and the Control Mode 1 flipflop is set 10-28. However, if the Processing Module was in the Control Mode 1, 10-24, then the contents of the BIAR2 are transferred to the BPR 10-26 and the Control Mode 2 flipflop is set 10-30. Thereafter, if the FINQ is not full 10-32, the contents of the Program Count Register enter TEMPQ 10-34 and the Fetch Memory to Stack instruction (FMS) operation code is sent to FINQ 10-36. The contents of the ADVAST Adder Unit (AAU) is sent to the PCR 10-40 after the contents of the ADVAST Address Register (AAR) and the Interrupt Variant are sent to the AAU 10-38. If the FINQ is still not full, 10-42, then the contents of the AAR are sent to TEMQ and the operations cone goes to the FINQ 10-46.

The contents of the AAU are then transferred to the Instruction Look Ahead Register (ILAR) after the contents of the Base Program Register and the Program Count Register are sent to the ADVAST Adder Unit 10-50.

Finally the Control Flag signals go to TEMQ, the operation code is transferred to FINQ, the AAR is reset 10-54 and the next instruction is sought 10-56. Table 6 follows and indicates the phases (PH) and the times (T) which correspond to the steps of flow diagram shown in FIG. 10.

TABLE 6.—ADVAST ENTER EXECUTIVE AND SCHEDULING PROGRAM (ESP) INSTRUCTION TIMING CHART

| Phase | Time | Conditions | Commands | Comments |
|---|---|---|---|---|
| 1-2 | | | AFMFQE1 AARAUE0 | Form new ILAR. |
| 1-2 | | | ABPAUE1 | |
| 1-2 | | | APCAUE1 | |
| 3-4 | | | AV2AUE1 | Enable variant to AAU |
| (1) | 1 | CRMT-1+CRQT-1+AFQFL-1. | AHOLDE1 | Wait until input to TEMPQ is available. |
| 3 | | | ABPTBE1 | Enable BPR to RTB. |
| 3 | | CRMT-0-CRQT-0 | ATBTQE1 | Enable RTB to TEMPQ. |
| 1 | 2 | | ASBFQT1 ASBTQT1 AJPH2S1 | FMS op code→FINQ. RTB→TEMPQ. |
| 2 | 3 | ACM1-0-ACM2-0 | ACM1-S1 AB1BPT1 | Set CM1 flag. BIAR1→BPR. |
| 2 | 3 | | APCTBE1 | Enable PCR to RTB. |
| (2) | 4 | AFQFL-1 | AJT4-S1 | |
| (2) | 4 | AFQFL-0 | ASBFQT1 ASBTQT1 AJPH3S1 AAUPCT1 | FMS op code→FINQ. RTB→TEMPQ. I variant→PCR. |
| 3 | | | AARTQE1 | Enable AAR to TEMPQ. |
| (3) | 6 | AFQFL-1 | AHOLDE1 | |
| (3) | 6 | AFQFL-0 | ASBFQT1 ASBTQT1 AJPH4S1 | FMS op code→FINQ. AAR→TEMPQ. |
| 4 | | | ASFTBE1 | Enable control flags to RTB. |
| (4) | 8 | AFQFL-0 | ASBFQT1 ASBTQT1 | FMS op code→FINQ. RTB→TEMPQ. |
| (4) | 8 | AFQFL-1 | AHOLDE1 | |
| (4) | 9 | | AJPHS1 ALAPRT1 AAULRT1 ASCR-R1 AAR-R1 | AAU→ILAR. Reset SCR. Reset AAR. |

Figure 11:
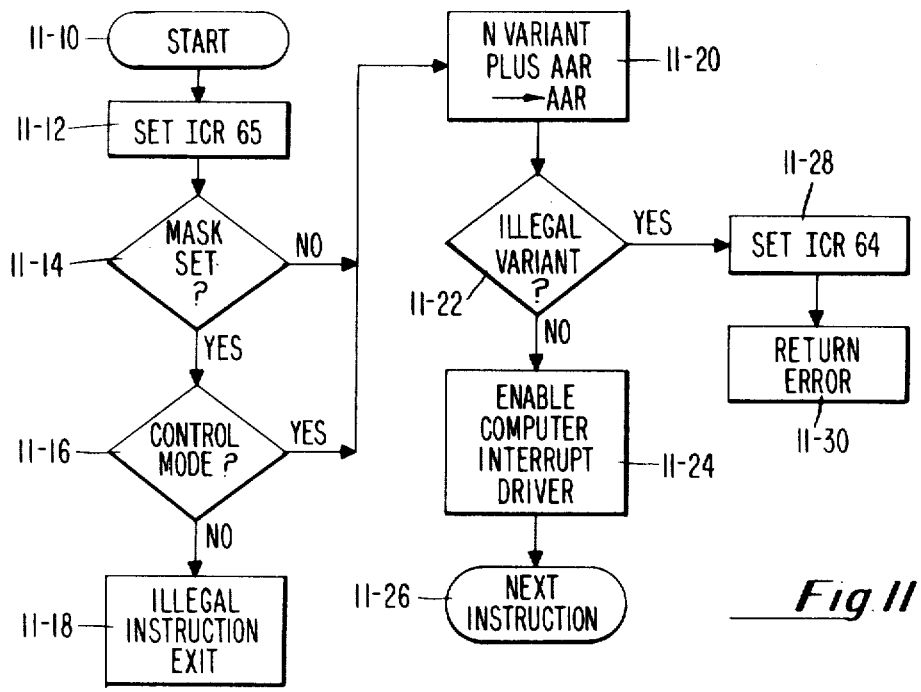
FIG. 11 is a flow diagram, similar to FIG. 9 but during an Interrupt Comptuer N (ICN) instruction.

The interrupt computer N (ICN) instruction is used to set an interrupt condition bit in the ICR of the Processor Module specified by the variant syllable N. The interrupt condition bit is set in the specified Processor Module, regardless of the module's mask configuration. However, the Processor Module will not be interrupted unless that condition bit is masked and the Processor Module is in the normal code of operation. If the Processor Module is stopped in control mode 1 (CM1) and the HLT flag is set, the interrupt will effect a restart. FIG. 11 is a flow diagram for the ICN instruction. Table 7 is the corresponding timing chart and it follows this explanation.

Any starting time 11-10 during phase 1 (PH1) that a transfer of the N variant to the ADVAST adder unit (AAU) is enabled, ICR bit 65 (within the Processor Module that is executing the instruction) is set 11-12, at time 2. If the interrupt mask register (IMR) bit 65 is true (1), i.e. the mask is set, and the Processor Module is in the normal mode 11-16 a jump to T1 of the ADVAST T counter is executed, and the interrupt is processed. If the processor is in the Control mode at time 3 (T3) the output of the AAU is transferred to the ADVAST address register (AAR). At time 4 (T4) the N variant is examined, and if the N variant has a legal configuration 11-22 the ADVAST phase counter jumps to phase 2

(PH2). If the N variant is illegal 11-22, the ADVAST T counter jumps to time 1. At any time of phase 2 (PH2) bits 15 through 18 of the AAR are examined, and the specified computer interrupt driver is enabled 11-24. At time 6 the contents of the ADVAST Barrel Switch (ABS) are transferred to the AIR, and the AAR is reset. The next sequential instruction is then ready from processing 11-26.

However, if the machine is in the control mode 12-16, it will thereafter determine whether or not the interrupt is an illegal variant 12-20. If it is, the machine will make an illegal variant exit 12-22. But if it is a legal operation code (OP Code) it will be sent to the FINQ provided the FINQ is not fully occupied.

If the FINQ is still not full 12-28, and not storage

TABLE 7.—ADVAST TIMING CHART FOR INTERRUPT COMPUTER N (ICN) INSTRUCTION (FIGURE 11)

| Phase | Time | Conditions | | | | Commands | Comments |
|---|---|---|---|---|---|---|---|
| 1 | | | | | | AVNAUE1 | Variant n to adder for indexing. |
| (1) | 2 | | | | | AIC65S1 | |
| (1) | 2 | AMK65-1 | | | | AJT1-S1 | |
| (1) | 3 | | | | | AAUART1 | Indexed variant to AAR. |
| (1) | 4 | AILVN-0 | | | | AJPH2S1 | |
| (1) | 4 | AILVN-1 | | | | AJT1-S1 | |
| | | | | | | AIC64S1 | Illegal variant "N". |
| 2 | | AAR15-X→AAR18-X: | 0 | 0 | 0 | 1 | CID01E1 | Enable computer interrupt driver 1. |
| | | | 0 | 0 | 1 | 0 | CID02E1 | Enable computer interrupt driver 2. |
| | | | 0 | 0 | 1 | 1 | CID03E1 | Enable computer interrupt driver 3. |
| | | | 0 | 0 | 0 | 0 | CID04E1 | Enable computer interrupt driver 4. |
| | | | 0 | 1 | 0 | 1 | CID05E1 | Enable computer interrupt driver 5. |
| | | | 0 | 1 | 1 | 0 | CID06E1 | Enable computer interrupt driver 6. |
| | | | 0 | 1 | 1 | 1 | CID07E1 | Enable computer interrupt driver 7. |
| | | | 1 | 0 | 0 | 0 | CID08E1 | Enable computer interrupt driver 8. |
| | | | 1 | 0 | 0 | 1 | CID09E1 | Enable computer interrupt driver 9. |
| | | | 1 | 0 | 1 | 0 | CID10E1 | Enable computer interrupt driver 10. |
| | | | 1 | 0 | 1 | 1 | CID11E1 | Enable computer interrupt driver 11. |
| | | | 1 | 1 | 0 | 0 | CID12E1 | Enable computer interrupt driver 12. |
| | | | 1 | 1 | 0 | 1 | CID13E1 | Enable computer interrupt driver 13. |
| | | | 1 | 1 | 1 | 0 | CID14E1 | Enable computer interrupt driver 14. |
| | | | 1 | 1 | 1 | 1 | CID15E1 | Enable computer interrupt driver 15. |
| (2) | 6 | | | | | | ABSIRT; AAR-R1. | ABS→AIR; RESET AAR. |

Figure 12:
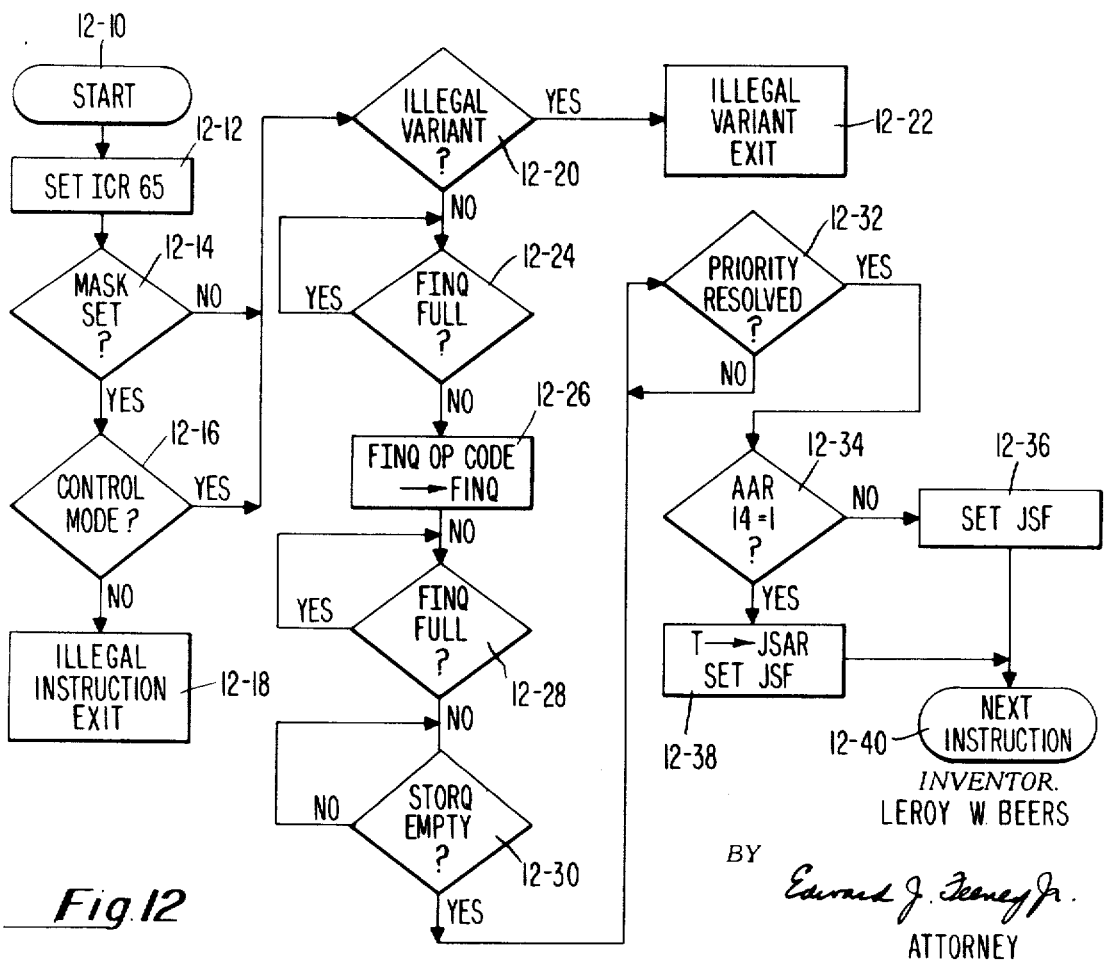
FIG. 12 is also a flow diagram for the ADVAST portion of the Central Processing Module but during an Imitate I/O Program instruction.

FIG. 12 illustrates the ADVAST flow diagram for initiating an Input/Output Program instruction. After starting 12-10, bit 65 of the interrupt condition register is set 12-12. If the corresponding mask bit of the interrupt mask register is set, the mode of the processor is checked. If the processor is in the normal mode (not control mode), the processor will terminate the execution of the IOP instruction by making an illegal instruction exit 12-18.

queue (STORQ) exists 12-30, the priority of the I/O operation will be determined 12-32. If the operation has priority and bit 14 of the ADVAST Address Register is a 1, then the contents of the T register are transferred to the Job Stack Address Register and the Job Stack Flag is set 12-38. The machine will then seek the next instruction 12-40. Table 8 which follows provides the timing information for initiating the IOP instruction illustrated in FIG. 12.

TABLE 8.—ADVAST TIMING CHART FOR INITIATE INPUT-OUTPUT PROGRAM (IOP) INSTRUCTIONS

| Phase | Time | Conditions | | | | Commands | Comments |
|---|---|---|---|---|---|---|---|
| (1) | | | | | | AVTAUE1 | Variant N to adder. |
| (1) | | | | | | AFØFQE1 | |
| (1) | 2 | | | | | AIC65S1 | |
| (1) | 3 | | | | | AAUART1 | Indexed variant to AAR. |
| | | AMK65-1 | | | | AJT1-S1 | |
| (1) | 4 | ALIVT-1 | | | | AJT8-S1 | Illegal variant. |
| (1) | 4 | AILVT-0-AFQFL-1 | | | | AHOLDE1 | Wait if FINQ is full. |
| (1) | 4 | AILVT-0-AFQFL-0 | | | | ASBFQT1 | FINQ op → FINQ. |
| (1) | 5 | ASQEY-0+AFDF-0 | | | | AW1N-E1, AHOLD E1 | Wait if FINQ is not done or STORQ is not empty. |
| (1) | 5 | ASQEY-1.AFDF-1 | | | | AJPH2S1 | |
| 1 | 8 | | | | | AIC64S1 | |
| 1 | 9 | | | | | ABSIRT1, AAR-R1 | |
| | | AAR | 15 | 16 | 17 | 18 | | |
| (2) | 6 | ARA14-0+ACB1-0: | 0 | 0 | 0 | 1 | AFJ01E1 | Enable job stack flag strobe for I/O #1. |
| | | | 0 | 0 | 1 | 0 | AJF02E1 | Enable job stack flag strobe for I/O #2. |
| | | | 0 | 0 | 1 | 1 | AJF03E1 | Enable job stack flag strobe for I/O #3. |
| | | | 0 | 1 | 0 | 0 | AJF04E1 | Enable job stack flag strobe for I/O #4. |
| | | | 0 | 1 | 0 | 1 | AJF05E1 | Enable job stack flag strobe for I/O #5. |
| | | | 0 | 1 | 1 | 0 | AJF06E1 | Enable job stack flag strobe for I/O #6. |
| | | | 0 | 1 | 1 | 1 | AJF07E1 | Enable job stack flag strobe for I/O #7. |
| | | | 1 | 0 | 0 | 0 | AJF08E1 | Enable job stack flag strobe for I/O #8. |
| | | | 1 | 0 | 0 | 1 | AJF09E1 | Enable job stack flag strobe for I/O #9. |
| | | | 1 | 0 | 1 | 0 | AJF10E1 | Enable job stack flag strobe for I/O #10. |
| | | | 1 | 0 | 1 | 1 | AJF11E1 | Enable job stack flag strobe for I/O #11. |
| | | | 1 | 1 | 0 | 0 | AJF12E1 | Enable job stack flag strobe for I/O #12. |
| | | | 1 | 1 | 0 | 1 | AJF13E1 | Enable job stack flag strobe for I/O #13. |
| | | | 1 | 1 | 1 | 0 | AJF14E1 | Enable job stack flag strobe for I/O #14. |
| 2 | | AAR14-1-ACB1-0 | | | | AJSARE1 | Enable address transfer. T to JSAR drivers. |
| 2 | | | | | | AOPFQE1 | |
| (2) | 6 | AAR14-1-ACB1-1 | | | | AHOL-DE1 | Wait if higher priority computer is doing I/O. |
| (2) | 7 | AAR14-1-ACB1-1 | | | | ABSIRT1, AAR-R1, AJPH1S1 | |
| (2) | 7 | AAR14-1 | | | | ASBFQT1 | Send FINST op code to get stack stepped up. |
| | 1 | FSKRR-0-FC1R-1 | | | | FHOLD | Wait for stack. |
| | 2 | | | | | FS1T1T | S → T. |
| | | | | | | FS2T2T | S → T. |
| | | | | | | FSETET | S → T. |
| | | | | | | FSMTMT | S → T. |
| | | | | | | FSGTGT | S → T. |
| | | | | | | FTEPST | Stack → S. |
| | | | | | | FTEPD1 | Decrement stack pointer. |
| | | | | | | FEND | End. |

The interrupt routine return instruction (IRR) shown in FIG. 13, places the contents of the four top computer stack locations into control flip-flops, the ADVAST address register (AAR), the program counter register (PCR) and the base program register (BPR) respectively. Referring to the figure, if the FINQ is not full 13–12, after starting 13–10, and the processor module is in the normal mode 13–14, the processor module is returned to normal mode 13–18. Next, the operation code is placed in FINQ 13–20. If the FINQ is still not full, FINQ operation code is placed into it. Thereafter if the Final Queue Flag (FQF) is set 13–26 the processor mode is reduced by 1 since this instruction must be executed in control mode. The next instruction 13–30 is specified by the sum of the PCR and the BPR as sent to the instruction look-ahead register (ILAR) 13–28.

Table 9 which follows is the ADVAST timing chart for the Interrupt Routine Return (IRR) instruction.

TABLE 9.—ADVAST TIMING CHART FOR INTERRUPT ROUTINE RETURN (IRR) INSTRUCTION

| Phase | Time | Conditions | Commands | Comments |
|---|---|---|---|---|
| (1) | | | AARAUE0 APCAUE1 ABPAUE1 | Inhibit AAR→AAU. PCR→AAU. BPR→AAU. |
| (1) | $\overline{1\cdot2}$ | | AFϕFQE1 | Enable FINQ op code→FINQ. |
| (1) | $\overline{3\cdot4}$ | | AOPFQE1 | Enable op code in AIR→FINQ. |
| (1) | 1 | AFQFL-1 | AHϕLDE1 | |
| (1) | 2 | | ASBFQT1 | AIR (1,6)→FINQ. |
| (1) | 2 | AINNM-1 | AIC68S1 AJT1-S1 | |
| (1) | 2 | | AICM-R1 | Reset Control Mode. |
| (1) | 3 | AFQFL-1 | AHϕLDE1 | |
| (1) | 4 | | AFϕFQT1 | FINQ op code→FINQ. |
| (1) | 5 | AFDF-0 | AHϕLDE1 | |
| (1) | 5 | | AAULAT1 ABSIRT1 | AAU→ILAR. |
| | | | ALAPTR1 | Reset ILA pointers. |

At any time of phase 1 (PH1) the operation inhibits the transfer of the ADVAST address register (AAR) to the ADVAST adder unit (AAU) and enables the transfer of the contents of the PCR and the BPR to the AAU. Further at any time except time 1 (T1) or time 2 (T2) logic circuits are prepared for the transfer of the FINQ op code to the final queue. Next at any time except 3 or 4 (T3 or T4) the operation enables the transfer of bits 1 through 6 of the ADVAST instruction register (AIR) to the final queue. The transfer then takes place at time T2. If FINQ is full, the process halts at T1 or T2 until an op code can enter the FINQ. At time T2 the mode of the Processor Module is reduced by 1. However, if the Processor Module is in the normal mode, bit 65 of the ICR is set and the interrupt is processed. At time T4, the FINQ op code is placed in the final queue. At time 5, and if FINST has processed a FINQ instruction, the contents of the AAU are transferred to the instruction look ahead register ILAR, and the contents of the ADVAST barrel switch (ABS) are transferred to the ADVAST instruction register. ADVAST is then ready for the next instruction.

FIG. 14 also relates to the Interrupt Routine Return (IRR) instruction, however it relates to the signal flow diagram which occurs through the final station (FINST) of the processor module rather than the advanced station (ADVAST) as in FIG. 13.

As seen in FIG. 14, the FINST operation comprises four separate transfers. Before each transfer the machine must determine whether the computer stack in FINST is ready to be read. Thus, there are four stack read ready operations 14–14, 14–24, 14–34 and 14–44. During each of these four transfers, the computer stack is stepped up once.

Thus after the operation is started 14–10, the ADVAST is enabled 14–12 and the stack is ready for reading 14–14, the contents of the top of the stack register T are transferred to the control flip-flops 14–16. Next, the second register (S) in the stack sends bits 14 to 35 to the corresponding locations of the T register 14–18. The top of the computer stack extension pointer (TEP) transfers corresponding bits to the S register 14–20 and the stack is stepped up 14–22.

During the remaining three transfers, bits of the T register are transferred to the AAR, 14–26, the PCR 14–36, and the BPR 14–46. After each of the transfers, the stack point TEP is stepped from TEP–1 to TEP 14–32, 14–42, and 14–50. After the fourth transfer the Final Queue Done Flag (FDF) is set 14–52 and the operation is ended. The timing chart is illustrated in Table 10 which follows.

TABLE 10.—FINST TIMING CHART FOR INTERRUPT ROUTINE RETURN (IRR) INSTRUCTION

| Time | Conditions | Commands | Comments |
|---|---|---|---|
| 1 | | FTRT-S | Set ADVAST enable. |
| 1 | FC1R-1·FSKRR-0 | FHϕLD | Wait for stack. |
| | | FTRCFT | T→ADVAST control. |
| | | FSMTMT | S mant.→T mant. |
| | | FTPSMT | Stack→S mant. |
| | | FTEPD1 | Decrement stack pointer. |
| 3 | FSKKR-0 | FHϕLD | Wait for stack. |
| 4 | | FTRART | T→AAR. |
| | | FSMTMT | S. mant.→T mant. |
| | | FTPSMT | Stack→S.mant. |
| | | FTEPD1 | Decrement stack pointer. |
| 5 | FSKRR-0 | FHOLD | Wait for stack. |
| 6 | | FTRPCT | T→PCR. |
| | | FSMTMT | S mant.→T mant. |
| | | FTEPST | Stack→S. |
| | | FTEPD1 | Decrement stack pointer. |
| 7 | FSKRR-0 | FHOLD | Wait for stack. |
| 8 | | FTRBPT | T→BPR. |
| | | FS1T1T | S→T. |
| | | FS2T2T | S→T. |
| | | FSETET | S→T. |
| | | FSMTMT | S→T. |
| | | FSGTGT | S→T. |
| | | FTEPD1 | Decrement stack pointer. |
| | | FFDF-S | |
| | | FEND | End. |

Referring to Table 10 it is noted that at time 1, the processor module enables a transfer of the T register to the ADVAST registers. At time T2 the contents of the T register bits 1 through 30 are transferred to control flip-flops, and at time T4 the contents of bits 31 through 38 are transferred to the AAR. At time T6, the contents of the T register bits 34 through 48 are transferred to the PCR. At time T8 the contents of T register bits 31 through 48 are transferred to the BPR and the final queue done flag is set. During each of the four transfers the computer stack is stepped up one.

SUMMARY

As a general rule, it is perhaps best to state first that when an interrupt condition occurs, it always sets an interrupt bit in the interrupt condition register to thereby record the condition. Now there may be situations when it is not desirable to respond to this interrupt. For example, if the machine is working in the normal mode and the mask bit corresponding to the interrupt bit is not set, then the machine will continue to execute the program which has initiated the interrupt. Thus, in spite of the fact that the instruction that has caused the interruption is for some reason an illegal one, the machine will execute that illegal program and not get interrupted for it. In short, the machine will not respond to that interrupt.

However, if the machine was working in the normal mode and the mask bit corresponding to that set interrupt bit was also set, then the machine will not execute that illegal instruction. That is, the machine will only respond to an interrupt when both the condition bit and the corresponding mask bit are set.

Now there are two other modes in which the machine can be operating. Both of these modes are known as control modes and they are differentiated by denoting them control mode 1 and control mode 2. The control mode of the machine is a specific mode, distinct and separate and almost all of the instructions available in this mode are legal. But even here there are situations when it is not desirable to have the machine respond to the interrupt signal even though it would be desired in the normal mode. For example, in the case of a no-access-to-memory interrupt or a parity error interrupt from memory, the machine would be best served by allowing it to check these interrupts out without being continually interrupted while executing the interrupted instruction.

Now if the machine is running in the normal mode with the corresponding bit in the interrupt mask register set, and a parity error interrupt signal or a no-access-to-memory interrupt signal is received, the machine will automatically interrupt and shift from normal to control mode. In control mode, the machine will also be interrupted for parity errors. In the present system, the mode is shifted from the control mode back to the normal mode but under the cognizance of the control program and the normal mode program continues to run without being automatically interrupted as it was when it was originally in normal mode. This operation of the processing module in the normal mode while under the direction of the control mode is entirely new with this system. Since the mode of the system is not actually normal during this period, it will be referred to as the quasi-normal mode.

The only way you could get back to normal mode in earlier systems was to return via the interrupt program. This was called the interrupt routine return (IRR).

Now, however, the control mode executive and scheduling program (ESP) has the power to change the mode of the processor from control mode to normal mode without leaving the ESP.

This is accomplished by loading the interrupt mask register. Now in the case of the IRR, the return to normal mode is completely automatic, it is hardware automatic and cannot be modified in any manner by the programmer.

In this interrupt system the programmer is given some power to change the mode of the machine. Now the programmer does not have complete power to change mode since the machine must recognize that this is the ESP and not the normal operation of an object program. But now the ESP can invite the diagnostic programs into the machine and set up the mode by loading the mask register so that the machine is in the normal mode but under the control of the ESP. The programmer is also allowed to execute various instructions that the diagnostic programs might need. At the same time, the programmer is given diagnostics of the mode under which he can operate with parity error and no access to memory and not get interrupted for it. This means that the programmer can keep on investigating the data to determine which bit is dropping during the transmission and what memory is causing the no access. The result of this investigation is that one of the memory modules or one of the processors is denoted as being faulty and once having been located it can be replaced and/or repaired.

Also, once the fault is located, the ESP can be informed of this and it can reassign the work of the faulty processor or reallocate the memory spaces required of the faulty memory modules.

Thus one of the important features of this invention is that the machine can effectively change its mode from the control mode back to the normal mode without actually leaving the ESP program.

Another important feature of the invention is that the present mask bit not only tells the system whether or not the processor desires to be interrupted, but also it actually grants or removes the ability to perform an illegal instruction, exceed bounds, etc. Thus a user program can be allowed to exceed memory bounds simply by preventing that interrupt signal from causing the processing module to shift from normal mode to control mode.

It is important to note that a record of that interrupt is in the machine even though the processor has not responded to it. Thereafter the machine can look at this interrupt at its convenience.

In the earlier interrupt system, disclosed in the previously mentioned related issued patent to Thompson et al., the only way the system could respond to an I/O completion signal was through the interrupt system. Specifically in that system the I/O Control Module sent back a result descriptor to the Processing Module and immediately the processor went into an automatic hardware interrupt jump.

However, with the present system of masking, the interrupt signal from the I/O Control Module does not immediately interrupt the processor unless the system desires it, but the system will always record the interrupt for the use and knowledge of the system. With this knowledge, the system can then release the I/O Control Module for further use without having ever interrupted the Processor Module.

Later, of course, the system can return to that Processor and sample the interrupt condition stored in the interrupt condition register.

The important thing to remember is that the system is not automatically interrupted by the completion of the I/O operation. That is, the system does not have sudden interrupts trying to force overlay of programs possibly for the few milliseconds that might be required to complete the present program.

Note, however, that if it is desired to operate the present system as former systems, this capability still exists. Thus, the present system not only has all of the advantages of former systems but in addition, possesses the capability for overcoming many, if not all, of the disadvantages of past systems.

The present system can be operated such that each interrupt condition automatically causes the interruption of the processor. This is accomplished merely by setting all of the corresponding mask bits in the mask register. But, by not setting these bits, the interrupt condition register will store for later recognition and use by the system of each of the interrupt signals. It can be done at the convenience of the operator, but never automatically to his detriment.

Still further, the present system includes extended external interrupt capabilities. In previous systems the only signals that were taken out of memory were parity error and no access to memory. The present system also provides from each of the memory modules, from each of the processing modules and from each of the I/O Control Modules information known as fail signals. Thus in each of the memory modules, there exists a memory fail register, in each of the processor modules there is a processor fail register and in each of the I/O Control Modules there is an I/O fail register.

The arrival at a processor module of a fail signal from any one of the memory modules, for instance, indicates to the processor module that a problem exists with that memory module.

Consider the example of a processor module which has lost parity generation ability. The processor module therefore is sending parity error signals to the memory module. Now in earlier systems, no record was made of this and the first time the system became aware of it was when that information was again requested from the memory module and it was found to be erroneous.

However, with the present system the memory fail register in the memory module indicates by an appropriate bit setting that processor No. 1 sent a parity error. At the same time it raises an interrupt line to the processor interrupt condition register to note that something has gone wrong. This could have been bad data coming in or going out or no access to memory or some similar discrepancy. But in the processor as soon as the interrupt signal is received, the processor will scan its own interrupt register. When the processor determines that it has not received a parity error, it is made aware that the trouble is not with the memory but rather with the processor itself.

To double check this, the ESP under these circumstances would load the exact same thing into another processor and execute the same thing. Now if this second processor executes the instruction without getting a memory error then it certainly points to the first processor as being the faulty element.

The important thing here is that the error is discovered immediately, i.e. right in real time and it is no longer necessary to wait until the program goes out of control to discover the existence of a problem.

In the present system each processor module has a seventy bit interrupt condition register corresponding to seventy interrupt conditions. Likewise, each processor module has a seventy bit mask register. Consequently each of the seventy interrupt conditions can be correspondingly masked.

The execution of a user program which permits an interrupt, or which permits a condition which can cause an interrupt, is temporarily suspended while the Executive and Scheduling Program is brought into the machine. Now if the program was one which the ESP declared as being allowed to exceed bounds then the ESP will have reset the mask register bit corresponding to that interrupt and the processor can continue execution of the program even though the memory bounds have been exceeded. However, if the program was one in which the ESP wanted to be notified in the event of exceeding bounds, then the ESP will have caused that mask in the mask register to be set. Now when the program exceeds bounds the control program is called into the machine automatically just as in earlier systems.

When this automatic interrupt jump is called the machine loads the base address register and the base program register for ESP and automatically the ESP is brought into the processor. Next, a standard procedure is started which senses and samples the interrupt condition register to determine the reason for the interruption.

There may be a plurality of interrupt bits set in the interrupt condition register so what is done next is to sample the mask register to determine which of the interrupt condition bits had a corresponding interrupt mask bit set.

The remaining interrupt condition bits may be forgotten, unless of course, the processor is interested in knowing just how many interrupt conditions have occurred.

As an example, suppose that the machine has been waiting for a bounds violation interrupt. Now when that interrupt occurs it may mean that the present program is completely finished, so the machine declares that this program is available to any taker. The memory housing that program may now be overlayed and the data areas of the memory are not available to other programs. This information is all in tables, so that the next step is to go to the new job table and bring in the instructions for the next program.

Part of this next program contains header information and contained in this is the information that the program will use for the mask register while executing this new program. The mask registers are loaded up with this information and the program is then turned over to the user.

Thus, the invention disclosed is an interrupt system which has a different configuration and response for a variety of different programs. For example, if the machine is working on an accounting problem such as the calculation of a payroll and there is an overflow in the arithmetic unit it goes without saying that the user would want to know of this immediately and consequently the machine would be interrupted. However, if the machine was performing a data manipulation to merely exercise the diagnostics, it is equally definite that while the user might like to be aware of any such overflow he would seldom if ever want to be interrupted for such an action. Now in either case, the condition bit in the ICR is set, but only in the payroll job is the machine interrupted for the overflow action. Thus the user gets an interrupt mode tailored to suit his program even though he is unaware of any selection being made. That is, the machine has decided the mode best suited to his needs all under the control of the ESP.

While there has been shown and described a single preferred embodiment of the invention there are obviously many modifications and variations possible, especially in view of the extensive teaching included herein. It is therefore understood that within the scope of the appended claims the invention may be practiced other than as specifically described and illustrated.

ABBREVIATIONS AND ACRONYMS $A_1$ (Address Syllable 1)
$A_2$ (Address Syllable 2)
A1A2 (Specifies 2 Syllable, 12 Bit Relative Address)
AAR (ADVAST Address Register)
AAU (ADVAST Adder Unit)
AB (Alternate Bounds Tag Bit)
ABL (Alternate Bounds Lower)
ABLR (Alternate Bounds Lower Register)
ABS (ADVAST Barrel Switch)
ABU (Alternate Bounds Upper)
ABUR (Alternate Bounds Upper Register)
ACR (ADVAST Communications Register)
ACUGO (Address Comparator Unit GO)
ACU (ADVAST Comparator Unit)
ADD (Algebraic Add)
ADDD (Add Double)
ADDM (Add Integer Magnitude)
ADDR (Address Field)
ADVAST (Advance Station)
AID (ADVAST Instruction Decoder)
AIR (ADVAST Instruction Register)
ALGOL (ALGOrithmic Language)
AMAR (Associative Memory Address Register)
AND (Logical And)
AOR (A Operand Register)
ARIT (Double Precision Arithmetic Operation)
ASLP (ADVAST Storage Queue Load Pointer)
ASM (Associative Memory)
ASMA (Associative Memory Address Register)
AT (ADVAST Time)
AUX (Transfer P Register to Top of Stack)
B (Base Register Specifier):
    000—No base
    001—BPR
    010—BXR
    011—BDR
    100—PRT
BCD (Binary Coded Decimal)
BDR (Base Data Register)
BEP (Bottom of Computer Stack Extension)
B1AR1 (Base Interrupt Address Register 1)
B1AR2 (Base Interrupt Address Register 2)
BOR (B Operand Register)
BPR (Base Program Register)
BSR (Barrel Shift Register or as an Instruction Load Barrel Shift Register)
BXR (Base Index Register)
CAR (Communications Address Register)
CAT (Channel Assignment Table)
CBB (Conversion of Binary and BCD)
CFR (Communications Fetch Register)
CHBR (Channel Base Register
CHORE (Chain of Runs Executive)
CLRF (Clear Field)
COBOL (COmmon Business Oriented Language)
COMF (Complement Field)
COML (Logical Complement
COMM (Communications Unit of the Central Processor Module)
COMP (Complement)
COMT (Two's Complement)
CPM (Central Processor Module)

CRC (Card Reader Controller)
C/S (Collector/Scheduler)
C/S Q (Collector/Scheduler Queue)
CSR (Communications Store Register)
DA (Data Array—Any Ordered Set of Data)
DEL (Delay)
DFC (Disc File Controller)
DJEZ (Decrement and Jump Equal to Zero)
DJNZ (Decrement and Jump Not Equal to Zero)
DIV (Divide)
DIVD (Divide Double)
DIVI (Integer Divide)
DIVM (Divide Mantissa)
DUP (Duplicate Top of Stack)
DUPD (Duplicate Double Length Words)
EAR (Effective Address Register)
EOB (End of Block)
EOF (End of File)
EOM (End of Message)
EOR (End of Record)
EOT (End of Transmission)
ESP (Executive and Scheduling Program or as an instruction Enter Executive and Scheduling Program)
ETB (Extract Tag Bits)
EXT (Extract)
EXTD (Extract Double)
f (Included Field)
f̄ (Excluded Field)
F (Two Instruction Syllables Designating the Included Field)
FAS (Fetch Address Register to Stack)
FILF (Fill Field)
FINQ (Final Station Instruction or as an instruction Final Queue Empty)
FINST (Final Station)
FLIP (Final Station Load Pointer)
FMA (Fetch Memory to Address Register)
FMC (Fetch Memory Conditionally)
FMS (Fetch Memory to Stack)
FMSA (Fetch Memory to Stack Absolute)
FMT (Fetch Modify Tags)
FORTAN (FORmula TRANslator Language)
FR (Function Register)
FRE (Function Register Extension)
FRS (Fetch Register to Stack)
GO (Start Channel Data Transfer Designated in AOR)
H (H Register)
HAT (H Register to A Register Transfer)
I (Indirect Tag Bit)
IBA (Instruction Base Address)
IC (Instruction Counter)
I/C (Interpreter/Controller)
ICN (Interrupt Computer N)
ICR (Interrupt Condition Register)
IDIOT (IDeal Interface OuT)
IDXL (Index Limit)
IDXQ (Index Queue)
IDXV (Index Value or Contents)
ILA (Instruction Look Ahead)
IMN (Interrupt Mask Bit N)
IMP (Implication)
IMR (Interrupt Mask Register)
INS (Insert)
INSD (Insert Double)
INT (Intergerize)
I/O (Input/Output Module)
IOP (Initiate Input/Output Program (IOP))
IRR (Interrupt Routine Return)
ISAR (Interrupt Stack Address Register)
ISLR (Interrupt Stack Limit Register)
ITB (Insert Tag Bits)
J (Jump Tag Bit)
JAT$_n$ (Jump to ADVAST Time $n$)
JCT (Jump Control Register)
JCW (Jump Control Word)
JEZ (Jump if Equal Zero)
JFT (Jump Field Test)
JNZ (Jump if Not Equal Zero)
JPHS (Jump to Phase Special)
JSAR (Job Stack Address Register)
JSF (Job Stack Flag)
JSTA (Jump Stack Test Arithmetic)
JSTL (Jump Stack Test Logical)
JSW (Job State Word)
JSWT (Job State Word Table)
JUMP (Jump Unconditional)
JXMT (Jump on Index Modify and Test)
JX$n$N (Jump when Index $n$ Not Equal to Zero)
JX$n$Z (Jump when Index $n$ Equals Zero)
L (Number of Bits in a Field)
L1 (Literal Syllable 1)
L2 (Literal Syllable 2)
LIL2 (Specifies 2 Syllable 12 bit Literal)
LAP (Look-Ahead Pointer Register)
LCS (Left Circular Shift)
LDX (Load Index Register)
LIT (6 Bit Literal)
LM (Local Memory)
LRC (Longitudinal Redundancy Character)
LS (Left Shift)
LTB (Load Tag Bits)
MEM (Memory Module)
MFR (Memory Failure Register)
MM (Memory Module (Main Memory))
MTC (Magnetic Tape Controller)
MUL (Multiply)
MULD (Multiply Double)
NBL (Normal Bounds Lower)
NBLR (Normal Bounds Lower Register)
NBU (Normal Bounds Upper)
NBUR (Normal Bounds Upper Register)
NOP (No Operation)
NORM (Normalize)
OP (Instruction Operation Code)
OR (Logical Or)
ORX (Exclusive Or)
P (Extension of Top of Stack Register or Instruction Base Designation Syllable)
PBA (Parameter Base Address)
PCR (Program Count Register)
PFR (Processor Failure Register)
PRT (Program Reference Table or Program Reference Table Base Register)
PRTL (Program Reference Table Limit Register)
PRTQ (Program Reference Table Queue)
R (Register Specifier)
RAAR (Reset ADVAST Address Register)
RCS (Right Circular Shift)
RCW (Return Control Word)
REL (Release Processor)
REQN (Request Access)
REV (Reverse T and S)
REVD (Reverse double length words)
RND (Round)
RPF (Reset Program Flag)
RPT (Replace P with T)
RS (Right Shift)
RTB (Register Transfer Bus)
RTP (Replace T with P)
RTS (Rearrange Top of Stack)
RW (Read Only Bit)
S (Second in Stack Register or as part of an instruction Starting Bit Number of a Field)
SBLR (Stack Bounds Lower Register)
SBUR (Stack Bounds Upper Register)
SCC (Shift Control Counters)
SCD (Syllable Count Decode)
SEP (Stack Extension Pointer Register)
SFE (Skip on Field Equal)
SFG (Skip on Field Greater)
SFL (Skip on Field Less)

SFU (Skip on Field Unequal)
SHF (Shift)
$SIC_N$ (Set Interrupt Condition "N")
SIRJ (Set Interrupt Jump)
SIS (Store in Interrupt Stack)
SJ (Set Up Jump)
SLIT Lit (Short Literal to Stack)
SPF (Set Program Flag)
SRJ (Subroutine Jump)
SRR (Subroutine return)
SSC (Syllable Shift Counter)
SSD (Step Stack Down)
SSM (Store Stack to Memory)
SSMA (Store Stack to Memory Absolute)
SSR (Store Stack to Register)
↑STACK (Step Stack Up)
↓STACK (Push Stack Down)
↑STACK-1 (Step Stack Up without effecting T)
↑↑STACK (Step Stack Up Twice)
STB (Store Tag Bits)
STEP (Step Stack Up)
STOP (Stop Processor)
STOR (Store)
STORQ (Storage Queue)
STX (Storage Index Register)
SUBD (Subtract)
SUBD (Subtract Double)
SUBM (Subtract Integer Magnitude)
SURE $Q_T$ (Set Unit Request for Temp Q)
SWP (Switch T and auxiliary (P) register
SWR (State Word Register)
T (Top of Stack Register)
TEMPQ (Temporary Queue)
TEP (Top of Computer Stack Extension Pointer)
TFT (True-False Toggle)
TLP (Temporary Queue Load Pointer)
TOOL (The Only LOgical Language)
TSC (Transfer State Word to Channel)
TSR (Temporary Storage Register)
TTY (Teletype Controller)
VAR 1 (Variant Syllable Bit One)
X (Index)
(X) Contents of Location Contained in X
X[S,L] If $X = X_1 X_2 \ldots X_n$, then
$\quad X[S,L] = X_S X_{S+1} X_{S+2} \ldots X_{S+L-1}$
X[Y] (Contents of Field Y in X
XM (Index and Modify Index)
XS (Index by Top of Stack)

GLOSSARY

ACCESS, RANDOM—Access to storage under conditions in which the next position from which information is to be obtained is relatively independent of the previous position or access.

ACKNOWLEDGE—Send a meaningful signal in answer to a request or query.

ADDER—A device capable of forming the sum of two or more quantities.

ADDRESSS—A label, such as an integer or other set of characters, which identifies a memory location or storage device.

ADDRESS, ABSOLUTE—The label assigned to a specific storage location by the designers of a machine.

ADDRESS, BASE—The label identifying the first word in a data area or routine. The base address is added to the relative address to obtain the absolute address.

ADDRESS, RELATIVE—A positional indicator to identify a location in a storage area with respect to the origin or base of that area.

ALGOL—(for ALGOrithmic Language) an international problem oriented language designed for the concise, efficient expression of arithmetic and logical processes, and the control of these processes.

ALGORITHM—A statement of the steps to be followed in the solution of a problem.

ALLOCATE—To assign storage locations to the main routines and subroutines, thereby fixing the absolute values of any symbolic addresses.

ALPHANUMERIC—Contraction of alphabetic-numerical; a system including letters, digits, and special symbols.

ARGUMENT—The quantity or quantities submitted to a function, e.g. X as in the intrinsic function: SIN(X), or the known reference factor necessary to find the desired item in a table or array. Sometimes referred to as a "key" as in "search key."

ARRAY—An ordered arrangement of items of information.

ASYNCHRONOUS PROCESSING—A method of computer system processing in which operations are taken up in response to signals indicating completion of predecessor operations instead of master clock signals.

AUDIT TRAIL—A file maintained by the system upon which are recorded the changes made to specified file(s) during the period of time since the last complete copy of the specified file(s) was removed from the system. The audit trail may be used for reconstruction of file destroyed by program error or system malfunction.

AUTOMATIC PROGRAMMING—Technique which employs the computer itself to translate programming from a form that is easy for a human being to produce and understand into a form suitable for use by a computer.

BASE—A number, the powers of which are assigned as the unit value of columns in a number system; also called radix or place value. For example, 2 is the base in binary representation, 8 is the base in octal notation, and 10 is the base in decimal notation.

BATCH PROCESSING—The method of presenting to a system sequentially several unrelated informations upon which the same logical procedures are to be followed.

BINARY—Involving a choice or a condition in which there are but two alternatives. For example, the binary number system uses the base two and contains only two symbols, zero and one.

BIT—Contraction of binary digit. Usually represents the status of one flip-flop, either off or one (0 or 1).

BLOCK—
(1) A group of computer words or records considered or transported as a unit, an item, or a message.
(2) In flow charts, an assembly of symbols with each symbol representing a logical unit of a program.

BOOLEAN—Refers to a system dealing with truth values, operating upon logical conditions rather than numbers.

BOOLEAN ALGEBRA—A system of algebra dealing with logical values as variables and having basic operators such as "and," "or," "not," etc.

BOOLEAN VARIABLES—An operand in a Boolean algebra expression. A Boolean variable may have the value of "true" or "false," commonly represented in computers by one and zero respectively.

BUFFER—Any reserved area within a device which stores information temporarily curing data transfers. A facility linked to: (1) an input device in which information is assembled from external storage and stored ready for transfer to internal storage; or (2) an output device into which information is transmitted from internal storage and held for transfer to external storage. Since computation continues while transfer between buffer storage and external devices take place, buffers are used to compensate for differences in the speed of the various components of the system so that the system can operate as an integrated unit.

BUSS—The interconnecting line(s) between devices which carry signals or communications between them.

CALL—
- (1) A set of characters or bits which demand an action to take place or some item of information; for example subroutine call, ESP call, descriptor call.
- (2) Transfer control from a main routine to a subroutine or macro.

CELL—
- (1) In thin film memory one bit of storage.
- (2) A 1000 A. thick 30 x 80 mil nickel-iron alloy deposit within a glass substrate.

CHANNEL—A path along which information may flow.

CHARACTER—One of a set of elementary symbols which may be arranged in ordered groups to express information; these symbols may include the decimal digits 0 through 9, the letters A through Z, punctuation symbols, special input and output symbols, and any other symbols which a computer may accept.

CHARACTERISTIC—The exponent portion of a floating-point-number. (See Floating-Point Representation).

CLEAR—Reset to zero.

COBOL—A COmmon Business Oriented Language designed for expressing problems of data manipulation and processing in English narrative form.

COLD JOB TABLE—An array containing information necessary for initialization of a user program which has been introduced to the system for scheduling to run.

COLLECTOR—A routine within the Executive Scheduling Program which has the function of calling all files necessary for a particular programs operation. It submits requests to the operators(s) and physically vertifies that all requested files are present.

COMPILE—Reduce a source program written in a non-machine language to produce a machine language routine to solve the problem defined by the source program.

COMPILER—A transistor program which reduces a problem-oriented language into the machine language of a particular computer.

COMPLEMENT—
- (1) TRUE COMPLEMENT—The quantity which when added to a given number yields the base of that number, e.g. the true or 10's complement of $6_{10}$ is 4.
- (2) BASE-1 COMPLEMENT—The quantity which when added to a given number yields one less than the base of that number, e.g. the base-1 or 9's complement of $3_{10}$ is 6.

COMPUTER—A machine which can calculate or perform reasonable arithmetic and logical operations and transform the results of these operations into a usable form.

COMPUTER STACK—The storage always available in the central processor, consisting of the T and S registers and a twelve operand micro-logic memory, for a total capacity of 14 operands.

COMPUTING SYSTEM—A group of interconnected equipments which as a unit perform reasonable arithmetic and logical operations and transform the results of these operations into usable form. The individual devices and equipments of the system are highly specialized to optimize the efficiency with which their particular functions within the system are performed.

CONCATENATING—Linking together by forming a chain or series, a series or order of things depending on each other.

CONFIGURATION—Relative arrangement of various components of the system.

CONSOLE—The unit of a computing system which provides communication between the computer and the operator. The B8500 console contains indicators for displaying the status of the system, a means for manual intervention or operation of the system, and a means of testing the memory modules.

CONTROL MODE—Condition of operation wherein instructions that can be performed in normal state are augmented by additional control operations. Some of the ESP routines are written to operate in control mode.

DATA ARRAY—Any ordered set of data, such as the information on a card, a tape record, a print line, the contents of a working area, etc.

DEADLINE—A type of job or CHORE in which a time for completion has been set and scheduling and priority assignment are dynamic in regard to meeting this goal.

DEBUG—To isolate and correct the mistakes in a program or the components of a computing system.

DESCRIPTOR—A computer word used specifically to define characteristics of a program element. For example, descriptors are used for describing a data record, a segment of a program, or an input-output operation.

DIAGNOSTIC ROUTINE—Routine designed to detect and locate either a malfunction of the system or a mistake in programming.

DISK—A type of relatively high speed storage device upon which words of information are magnetically recorded on concentric tracks of a circular plane.

DOUBLE PRECISION—A quantity having twice as many digits as are normally carried in a specific computer word. Often called double length.

DUMMY FILE—A dummy file is a file that a run will call for in its normal processing, but will receive an End of File indication on the first read from that file. In the B8500 this mechanism allows chores to be written to drive programs which have optional files.

DUPLEX, FULL—A line or buss capable of handling communication in both directions simultaneously.

DUPLEX, HALF—A line or buss capable of handling communication for a simplex device or in one direction at a time for a duplex device.

EDIT—The act of arranging information from input-output devices. This may involve the selection of pertinent data; the insertion of symbols such as page numbers and check-protection characters, and standard processes such as zero suppression.

EXECUTIVE SCHEDULING PROGRAM (ESP)—A computer program to control the operation of the system. It is designed to minimize the amount of intervention required of the human operator. ESP performs the following functions: schedules programs to be processed; initiates segments of programs; controls all input-output operations to ensure efficient utilization of each system component; allocates memory dynamically; issues instructions to the human operators and verifies that their actions were correct, etc.

EXPONENT—A number may be divided into an exponent and a mantissa. The exponent positions radix point location relative to the mantissa. In the B8500 the exponent is expressed as an 11 bit field and a sign.

EXTENSION MODE—The mode of stack operation which extends the computer stack to a memory stack area.

EXTERNAL STORAGE—Storage facilities removable from the computer itself but holding information in a form acceptable to the computer (magnetic tape, punched card, etc.).

FIELD—A set of one or more bits, digits or characters which is treated as a unit of information.

FILE—A collection of records; an organized collection of information directed toward some purpose. (The records in a file may or may not be sequentially filed according to a key contained in each record.) B8500 files may be of the following types: program, random, serial and dummy.

FIXED-POINT REPRESENTATION—An arithmetic notation in which all numeric quantities are expressed by the same number of digits with the decimal point (for base 10) or octal point (for base 8) assumed in a fixed location in each number. Alignment of numbers with different assumed locations of the points must be performed by the program before an arithmetic operation such as addition can be performed.

FLIP-FLOP—A bi-stable device which may assume a given stable state depending upon the pulses of one or more input points and which has one or more output points. The device is capable of storing a bit of information, controlling gates, etc.

FLOATING-POINT REPRESENTATION—An arithmetic notation in which all numeric quantities have an associated indication of the decimal point location (base 10) or octal point location (base 8). Automatic alignment of numbers and calculation of the location of the point can be provided in arithmetic on floating-point numbers. A floating-point number consists of two parts: a 35 bit real value with sign called the mantissa; and a signed number called the characteristic (or exponent) which indicates the number of places to the right or left that the actual binary point is from the assumed binary point in the mantissa.

FORMAT—The predetermined arrangement of characters, fields, lines, page numbers, punctuation marks, etc. in input, output, or working storage records.

FORTRAN—A FORmula TRANslator language for writing problem oriented statements to be compiled and executed on a computing system.

FRACTIONAL—The portion of a number which is to the right of the decimal, octal or binary point.

FRAME—In thin-film memory forty substrates in an 8 by 5 array, providing 256 words of 104 bits each. Eight frames comprise a side.

GATE—An electronic circuit with two or more inputs and one output, with the property that a pulse goes out on the output line if and only if some specified combination of pulses occurs on the input lines.

HARDWARE—The mechanical, magnetic, electrical, and electronic devices from which a computer system is constructed.

HARDWARE INDEPENDENT PROGRAMMING—Property of the B8500 to accept changes in system configuration and adjust programs accordingly to yield maximum utilization of all modules without reprogramming or recompilation of programs.

HOT JOB TABLE—An array containing the information necessary for initialization or reinitialization of a program which has been introduced to the system and is scheduled to run or has been suspended by the Executive Scheduling Program and will be resumed.

HOUSEKEEPING—Operations not directly oncerned with the objective of a program; e.g., packing or rearranging data, subroutine linkages, etc.

INACTIVE FILE LIST—Directory of all files known to the system. (See SYSTEM DIRECTORY)

INDEX—Increment or decrement to a base address.

INDICATOR—A light, usually on the operator's console, that is turned on to indicate a particular condition occurring in the computing system.

INDIRECT ADDRESS—An address which identifies a memory location containing an address. The contents of the memory location is the address of the desired information or may also be an indirect address.

INPUT-OUTPUT (I/O)—
(1) Information introduced to or produced by the system.
(2) The Input-Output Processor Module which handles formatting reception and delivery of the above information to and from the peripheral device controllers and main memory.

INTEGRAL—The whole number portion of either a decimal or octal number. Refers to all the digits to the left of the decimal.

INTERFACE—The between device lines of communication. That which two or more devices have in common for the purpose of communication.

INTERRUPT—A signal generated as a result of a detected error condition, or service request. Provides the Executive Scheduling Program with the facility to maintain control of all system functions.

ITERATION—A single execution of repetitive program steps or a loop.

JUMP—An operation which may alter the execution sequence of a program. Normally instructions are executed in sequence; a jump operation causes a termination of the sequence and directs the Processor to a specified location for the next instruction. A conditional jump operation is a jump operation which takes place only if a specific condition exists in the Processor. Usually the condition is a result of a test or comparison operation. If the specific condition does not exist, a jump is not executed and sequential execution of instructions continues.

KEY—One or more digits or characters used to identify an item of information.

KEYBOARD—The portion of the supervisory printer via which the operator can communicate to the system.

LANGUAGE, MACHINE—Information recorded in a form which a computer can handle. The coded operations that control information and addresses employed within the processor to express a program.

LIBRARY—Collection of fully tested standard programs and subroutines for repeated use by, or incorporation into, other programs.

LINK—To provide a means by which physically non-contiguous data or program areas may be sequentially accessed.

LITERAL—An element in a program which is itself a quantity or alphanumeric constant to be used by the program rather than being an address of the quantity or constant.

LOCAL MODE—The mode of stack operation which limits the stack to the computer stack.

LOCATION—A storage position in a storage device distinguished by a unique address.

LOCK—Set a bit which when tested will indicate the condition and preclude any operation on the locked data.

LOG—Summary of scheduling, timing, program runs, etc. maintained by the Executive Scheduling Program.

LOOP—A coding technique whereby a group of instructions is repeated with instruction modification and/or with a modification of the data being operated upon. It is a series of instructions, the last of which directs the computer to start again at the first instruction of the series.

MACRO—A subroutine of general utility; a group of instructions written to fulfill a certain purpose which may be called any number of times within one or more programs.

MAGNETIC DISK—A rotating disk with a magnetizable surface on which information may be stored as a pattern of polarized spots along any one of a number of concentric circular recording tracks.

MANTISSA—Significant bits of a floating-point number (35 binary bits in a single-precision number of the B8500). (See Floating-Point Representation.)

MAPPING—The technique of placing conceptually contiguous information in physically non-contiguous locations while providing a table and a method of linking the so formed portions of information.

MASK—A word in memory or a register which indicates which parts of another word are to be operated upon.

MASTER CLOCK—The device which controls the basic timing cycle of the computer. B8500 master clock frequency is 20 megacycles.

MEGACYCLE/SEC.—A million cycles per second. The basic pulse rate of the B8500 is 20 megacycles/second.

MEMORY EXCHANGE— Electronic switching logic which controls information flow among Memory Modules and the Processors or Input/Output Modules.

MEMORY MODULE—Two thin-film stacks each of which provide 4,096 words of 104 bits. As the two stacks of a memory module are simultaneously accessed the effective read or write may be to one of 4,096 words of 208 bits. To the processor, considering 52 bit words, the effective capacity is 16,384 words.

MEMORY STACK—
(1) The storage locations made available by ESP to extend the computer stack in main memory, the capacity of which is limited by the stack bounds assigned by ESP.
(2) In a memory module the thin-film stack. (See THIN-FILM STACK.)

MICROSECOND — One millionth of a second (0.000001 sec. or 1 μs).

MILLISECOND—One thousandth of a second.

MODE, WORD—The method of operation of the B8500 in which the basic unit of information is a word composed of 48 bits plus three tag bits and one for parity.

MODULARITY—The property of a system resulting from the construction or assembly of the system from logical subunits (modules). In the B8500 this property provides the capability of constructing a system with the proper number of each type of module to match varying processing requirements efficiently and to maximize the utilization of each module.

MODULE—A logical subunit that may be easily detached from, or included with, the whole system. Processor, Memory, Input-Output, Magnetic Tape Units, and Storage Disks are typical modules of the B8500 system.

MODULUS (MODULO)—The number of distinct integers in a finite system of numbers. For example, in a modulo 5 system, the numbers are 0, 1, 2, 3, and 4. In this system larger numbers are expressed by dividing them by the modulus until a remainder less than the modulus is obtained. For example, 10 is 4 in the modulo 5 system. If a counter is "Modulo 5"; when it is set at 4, an increment of 1 will result in a setting of 0.

MULTIPLEX—The technique of sending several signals simultaneously over the same line.

MULTIPROCESSING—Processing several programs or program segments concurrently on a "time-share" basis. The Processor is only active on one program at any one time while operations such as input-output may be performed in parallel on several programs. The Processor is directed to switch back and forth among programs under thhe control of the EXECUTIVE SCHEDULING PROGRAM.

NESTING—Enclosing one program element of a particular type, such as a subroutine, within another of the same type.

NORMALIZE—To adjust the exponent and mantissa of a floating-point result so that the mantissa lies in the prescribed standard (normal) range; standardized.

NORMAL MODE—The condition of operation wherein the instructions are restricted to the conventional aspects of computation (adding, subtracting, information transfer, etc.). The detection of an exceptional condition (interrupt) that occurs while in this mode suspends operation in this mode and ESP processing begins in control mode.

OBJECT PROGRAM—A set of machine-language instructions for the solution of a specified problem, obtained as the end result of the compilation process (see Compiler, Source Language).

OCTADE—A group of 3 bits used to represent one octal digit. There are 16 octades in one B8500 word.

OCTAL—A number system based on powers of 8 rather than 10 as in the decimal system. Includes only the digits 0, 1, 2, 3, 4, 5, 6 and 7.

OPERAND—Any of the quantities entering into an operation. An operand is typically a number for arithmetic operations. For comparison operations, an operand may be an alphanumeric field.

OPERATORS—Symbols that denote a fixed, predefined set of operations to be performed in a specified sequence. There are a number of classes of operators in the B8500: for example, the arithmetic operators are: $+$, $-$, $*$ or $\times$, $/$, $**$ or $\times\times$; the relational operators are: $=$, $\neq$, $>$, $\geq$, $<$, $\leq$.

OVERFLOW—In arithmetic operations, the generation of a quantity beyond the capacity of the register or location which is to receive the result; over capacity; the information contained in an item of information which is in excess of a given amount.

OVERLAY—A technique for bringing routines into high speed memory from some other form of storage during processing, so that several routines will occupy the same storage location at different times; used when the total memory requirements for a program exceed the available high speed memory.

PACK—To combine several brief or minor items of information into one machine item or word by utilizing different sets of digits for the specifications of each brief or minor item.

PARALLEL OPERATION—Flow of data through the system or any part of it, using two or more communication lines or channels simultaneously.

PARALLEL PROCESSING—Processing more than one program at a time on a parallel basis, where more than one Processor is active at a time (distinguished from Multiprocessing where only one Processor is active on one program at a time).

PARAMETER—In a subroutine, a quantity which may be given different values, when the subroutine is used in different parts of one main routine but which usually remains unchanged throughout any one such use. To use a subrotine successfully in many different programs requires that the subroutine be adaptable by changing its parameters.

PARITY CHECK—A summation check in which the binary digits, in a character or word, are added (modulo 2) and the sum checked against a single, previously computer parity digit. A B8500 word (52 bits) must contain odd partiy (an odd number of Binary one's.)

PERIPHERAL EQUIPMENT—Any of the several devices, primarily used to communicate with a system, not considered a part of the main processing and control system. On the B8500, the peripheral equipment includes Magnetic Tape Units, Disks, Line Printers, Card Readers, Card Punches, Communications Devices, Keyboard, Message Printer, Paper Tape Readers and Punches, Graphic and Video Displays.

POINTER—A register or storage location assigned to contain the address of a changing location.

POLISH NOTATION—A method of writing logical and arithmetic expressions without the need for parentheses originated by the Polish logician J. Lukasiewicz. For example: Normal algebraic notation.

$$(Z+Y)\times(A-B)$$

in Polish notation: $ZY+AB-\times$.

POLLING—A technique of querying Input terminal devices. In the case where more than one device is attached to a line or buss, only one may be active at a time. The processor queries each device on a line in sequence. If the device is idle, it sends an answering signal and the polling sequence is continued. If the device is ready, e.g. tape mounted and under read head, the polling signal will act as a start signal and the device will be active on the line until completion of operation at which time polling will be continued with the next device.

PRECISION—The degree of exactness with which a quantity is stated. For example, the number 2.783 is precise to four digits, but does not necessarily have four digits of accuracy.

PRESENCE BIT—A single flag bit appearing in descriptors to indicate whether or not the information to which reference is made by the descriptor is in thin-film memory at this time.

PRIORITY—A class assigned to a program or program segment to specify the relative processing demand. The priorities of all programs to be run are taken into consideration by the Executive Scheduling Program in arriving at a schedule.

PROGRAM (Noun)—A plan for the solution of a problem. A B8500 program may be a statement of the problem in ALGOL, COBOL, FORTRAN or the translated segment object (compilation result) program.

PROGRAM (Verb)—To plan a computation or process from the original statement of the problem to the delivery of the results, including the integration of the operation of the resulting program into an existing system (for conventional computers). For the B8500: A system analysis and statement of the problem in source language.

PROGRAM REFERENCE TABLE (PRT)—An area in memory for the storage of descriptors for each external object referenced by a compilation. Permits programs to be independent of the actual memory locations occupied by data and parts of the program. Thus programs and data can be placed into any available memory areas without modification to the program.

PRT LINE—An entry within the program reference table.

QUEUE—Locations in a high speed local memory provided specifically for the storage of instructions and operands to which rapid access is desired.

RANDOM ACCESS—See Access, Random.

REAL TIME—Solving problems as they occur so that results can be used to guide the continuing operation.

REAL VARIABLE—A variable over the rational and irrational classes of numbers. In AGOL a real variable is a floating point number as distinct from an integer variable which is an integer.

RECORD—A group of fields maintained together as an item.

RECURSIVE—Having the characteristic of occurring within itself. The recursive occurrence could itself be recursive. For example: In ALGOL a Procedure which contains a Procedure Statement in its body calling for the activation of itself.

REENTRANT—A conceptual term referring to the independence and self-initializing capability of a program or program segment. The coding and data areas are organized in such a fashion that the execution by two or more processors at the same time will be independent of one another.

REGISTER—The hardware for storing one or more computer words or for maintaining internal system control.

RELOCATABILITY—A facility whereby programs or data may be located any place in memory at different times without requiring modification to the program and all data are independently relocatable with no loss in efficiency.

RESET—To return a device, bit or word to zero or its initial condition.

RESTORE—To return a cycle index, a variable address, or other computer word to its initial or a preselected value.

RETURN—An operator in a subroutine which transfers control to the next instruction in the original routine of the program which caused entry to the subroutine.

RETURN POINT—The instruction in the program segment to which control is transferred after the completion of a subroutine or an intercession by the Executive Scheduling Program.

ROUTINE—A set of coded instructions arranged in proper sequence to direct the computer to perform a desired operation or series of operations.

RUN—One performance of a program on a computer.

SCHEDULING—Designation of time and sequence of projected operations. One of the functions of the Executive Scheduling Program.

SEGMENT (Verb)—To divide a program into an integral number of parts, each of which performs some part of the total program and is capable of being completely stored in internal memory.

SERIAL—Processed one after the other in a single facility or single piece of equipment; sequential.

SERIAL TRANSFER—A system of data transfer in which elements of information are transferred in succession over a single line.

SET—To return a device, bit or word to one or to the "on" state.

SIDE—In thin-film memory eight frames. A side contains 2048 words and 104 bits. Two sides comprise a thin-film stack.

SIMULTANEITY — Concurrent communication between various units of a system at the same instant.

SLEEP TABLE—An array of information describing the exact processor status at the time of suspension of an Executive Scheduling process.

SOFTWARE — Programs, routines, and procedures which combined with hardware are a computer system (the Executive Scheduling Program, compilers, etc.).

SOURCE LANGUAGE—The language used by the programmer to state the definition of a problem. ALGOL, COBOL and FORTRAN are examples of source languages. Source languages are closely related to the type of problem being stated. Source language should not be confused with machine language. A program is written in source language by the programmer. This source program is then translated to the object program (in machine language) by a compiler program. (See Object Program, Compiler.)

STACK—
  (1) The total storage of operands which are automatically shifted toward or away from the T register, in response to the operand demands of the instruction string. (See Computer Stack, Memory Stack (1), Extension Mode, Local Mode.) A Stack as used in the B8500 operates on the "last-in-first out" principle, that is, the last item of information placed in the stack will be the first item of information used when information is required from the Stack. Operators perform their operations on information at the top of the stack. (See Operators.)
  (2) In a memory module the thin-film stack. (See THIN-FILM STACK.)

STORAGE—Any device into which information can be copied, which holds this information, and from which the information can be obtained at a later time.

STORAGE ALLOCATION—Assignment of specific memory addresses to individual program elements (done automatically in the B8500) at object running time by Executive Scheduling Program.

SUBROUTINE—The set of instructions necessary to carry out a defined operation; a subunit of a program.

SUBROUTINE CALL—A set of characters or lists which initiate a subroutine and contain the parameters or identification of the parameters required by the subroutin.

SUBSTRATE—In thin-film memory a 70 x 43 x 0.2 mm. glass plate containing 768 cells in a 24 by 32 array. Forty substrates make a frame.

SYLLABLE—A portion of a word. In the B8500, 6 bits.

SYNTAX—Connected system or order of symbol arrangement, the rules or grammar of a language.

SYSTEM—An assembly of components united by some form of regulated interaction to form an organized whole.

SYSTEM DIRECTORY—List of all files currently active or physically present on the system. (See INACTIVE FILE LIST.)

TAG BITS—Three bits which are used to indicate the type of word, i.e. a descriptor or control word.

TERMINAL—A device most remote from the central processor in a computing system configuration. That which is in direct communication with persons or equipment external to the system.

THIN-FILM STACK—In memory two sides (16 frames) providing 4.096 words of 104 bits. Two stacks comprise a memory module.

THROUGH-PUT—The total productive work capability of a system.

TIME-SHARING—Interruption of the operation of the main program in a computer by subsidiary or unrelated calculation, with the object of making economic use of computer speed when this is disproportionate to input-output speeds. Also, time-sharing refers to the ability of a module to refer to memory when the Memory Module is not being referenced by some other module. Since some modules make infrequent reference to memory during their operation, by interleaving the reference several modules can appear to be having access to a Memory Module simultaneously.

TRANSFER—To copy, exchange, read, record, store, transmit, transport, or write data; to change control.

TRANSLATE—To produce a statement in one language equivalent in meaning to a statement in a different language.

VERIFY—To check data transfer or transcription, especially those involving manual processes such as keypunching.

WORD—A set of characters or binary digits which occupies one storage location and is treated by the computer as a unit and transferred as such. A word in the B8500 may contain 8 alpha-numeric characters, a binary value in fixed or floating-point notation, two to eight instructions, literal syllables, or a program or data descriptor.

What is claimed is:

1. In a modular data processing system having at least one central processing module, at least one memory module and at least one input/output control module, an improved interrupt apparatus comprising means within said at least one central processing module to receive and store each of a plurality of interrupt condition signals, further means within each of the remaining modules of the system connected to said receive and store means to provide interrupt condition signals for transfer to the interrupt receiving and storing means, each of said at least one central processing module including still further means also connected to said receive and store means for selectively preventing the received and stored interrupt condition signals from the remaining modules in said system from automatically interrupting the normal operation of the processing module.

2. The improved interrupt apparatus as set forth in claim 1 wherein the receiving and storing means in said at least one central processing module comprises an interrupt condition register having a plurality of bistable location elements corresponding in quantity to the plurality of interrupt conditions desired for the modular data processing system.

3. The improved interrupt apparatus as set forth in claim 2 wherein the further means in said at least one central processing module for selectively preventing the received and stored interrupt condition signals from automatically interrupting the normal operation of the processing module is an interrupt mask register having a plurality of location elements, a corresponding plurality of AND gate means, means for connecting each of said plurality of mask register elements to one of said AND gates, and means for individually connecting each of said condition register elements to one of said AND gates to thereby provide an output signal from each of said AND gates only upon the concurrence of signals from one of the mask register elements and a corresponding one of the condition register elements.

4. The improved interrupt apparatus as set forth in claim 3 further including a mode shifting means connected to all of said AND gate means to shift the mode of the at least one central processing module upon the activation of any one of said plurality of AND gates.

5. In a modular data processing system having a plurality of processing modules, a plurality of memory modules and a plurality of input/output control modules, an improved interrupt apparatus comprising means within each of said central processing modules to receive and store each of a plurality of interrupt condition signals, means within each of said plurality of central processing modules, within each of said plurality of memory modules and within each of a plurality of input/output control modules to provide interrupt condition signals to be transferred to the interrupt receiving and storing means of each of said central processing modules, respective connection means between said modules to accomplish said transfer, each of said central processing modules including further means connected to said receive and store means for selectively preventing the received and stored interrupt condition signals from automatically interrupting the normal operation of the processing module.

6. The improved interrupt apparatus as set forth in claim 5 wherein the means within each of said central processing modules to receive and store each of a plurality of interrupt condition signals is an interrupt condition register and the further means within each of said central processing means for preventing the received and stored interrupt condition signals from automatically interrupting the normal operation of the processing module is a mask register and a plurality of AND gates with means for individually connecting each of said AND gates to each of the locations of the mask register as well as each of the locations of the interrupt condition register.

7. In a modular data processing system having at least one central processing module, at least one memory module and at least one input/output control module, an improved interrupt apparatus comprising means within each of said at least one central processing modules to receive and store each of a plurality of interrupt condition signals, means within said at least one central processing module, said at least one memory module and said at least one input/output control module to provide interrupt condition signals to be transferred to the interrupt receiving and storing means, respective connection means between each of said modules to accomplish said transfer, each of said at least one central processing module including further means connected to said receive and store means for selectively preventing the received and stored interrupt condition signals from automatically interrupting the normal operation of the processing module.

8. The modular data processing system as set forth in claim 7 wherein the further means included in each of said processing modules for selectively preventing the automatic interruption of the normal operation of the processing module, includes still further means for selectively enabling the automatic interruption of said central processing module.

9. The modular data processing system as set forth in claim 8 wherein said means for selectively enabling the automatic interruption of said central processing module includes further means for shifting the operational mode of the central processing module from a normal operating mode to one of a plurality of control operational modes in response to the receipt of a selective enabling signal causing the automatic interruption of the central processing module.

10. In a data processing system having a plurality of functional modules, including at least one central processing module, at least one memory module and at least one I/O control module, an improved interrupt apparatus comprising means within said at least one central processing module to receive and store each of a plurality of interrupt condition signals, means for shifting said central processing module from its normal operating mode to a control operating mode, means connected between the interrupt condition storage means and the shifting means for selectively enabling certain predetermined interrupt condition signals to cause said central processing module to shift from its operating mode, and means connected to said selective enabling means and responsive to control operational mode signals to cause said central processing module to shift back to its normal operating mode while remaining under the executive direction of the control mode signals.

11. The improved interrupt apparatus as set forth in claim 10 wherein said shifting means includes means for automatically shifting said central processor module from its control mode back to its normal operating mode.

12. In a data processing system having a plurality of functional modules, including at least one central processing module, at least one memory module and at least one I/O control module, an improved interrupt apparatus comprising means within said at least one central processing module to receive and store each of a plurality of interrupt condition signals, means for sequentially shifting said central processing module from its normal operating mode to a plurality of control operating modes, means connected between the interrupt condition storage means and the shifting means for selectively enabling certain predetermined interrupt condition signals to cause said central processing module to shift from its operating mode and from any of its earlier sequenced control modes, and means connected to said selective enabling means and responsive to any of its control operational mode signals to cause said central processing module to shift back to its normal operating mode while remaining under the executive direction of said control operational mode signals.

13. The improved interrupt apparatus as set forth in claim 12 wherein said sequential shifting means includes means for sequentially shifting said central processing module from its normal operating mode to a first and thereafter to a second control mode.

14. In a data processing system having a plurality of functional modules including a plurality of central processing modules, a plurality of memory modules and a plurality of I/O control modules, an improved interrupt apparatus comprising means within each of said plurality of central processing modules to receive and store each of a plurality of interrupt condition signals, means for selectively shifting each of said central processing modules from its normal operating mode to at least one control operating mode, means connected between the interrupt condition storage means and the shifting means for selectively enabling predetermined interrupt condition signals from any other module in the system to cause a selected central processing module to shift from its operating mode, and means connected to said selective enabling means and responsive to control operational mode signals to cause said selected central processing module to shift back to its normal operating mode while remaining under the executive direction of said control mode signals.

15. In a modular data processing system having a plurality of central processing modules, a plurality of main memory modules and a plurality of input/output control modules, an improved interrupt apparatus comprising means in each of said modules to provide a fail signal from each of said modules when any one of a plurality of errors is detected therein, further means in each of said modules for receiving and storing the information being selected at the time of the occurrence of any one of said errors together with a predetermined operation code corresponding to and identifying said error, means within each of said plurality of central processing modules for reading and indicating the contents of the failure means in each of the system modules and means for receiving and storing an interrupt condition indication within the central processor module which requested the information at the selected location.

16. The improved interrupt apparatus as set forth in claim 15 wherein additional means are included in each of said plurality of processing modules for selectively enabling said processing module to respond to said interrupt condition indication by shifting its operational mode.

17. The improved interrupt apparatus as set forth in claim 16 wherein said additional means is a mask register having a plurality of bistable location elements, with a corresponding plurality of AND gates and an interconnecting means therebetween.

18. In a modular data processing system having a plurality of central processing modules, a plurality of main memory modules and a plurality of input/output control modules, an improved interrupt apparatus comprising means in each of said memory modules to provide a memory fail signal from each of said memory modules when any one of a plurality of errors is detected therein, a memory fail register within each of said memory modules coupled to said memory fail signal providing means, the occurrence of any one of said plurality of error signals causing the memory address being selected at the time of said error to be placed in said memory fail register together with a predetermined operation code corresponding to and identifying said error, and means within each of said plurality of central processing modules for reading the contents of said memory fail register and selectively initiating an error interrupt operation within the central processor module which requested the information causing the error signal.

19. The improved interrupt apparatus as set forth in claim 18 wherein each of said central processing modules and each of said I/O control modules individually include a fail register connected in the data processing system as are said memory fail registers.

20. In a modular data processing system having at least one central processing module, at least one main memory module and at least one input/output control module, an improved interrupt apparatus comprising: means in each of said at least one memory module to provide a memory fail signal from each of said memory modules when a parity error, a wrong address error or an invalid operation is detected therein, further means in said at least one memory module for storing the memory address being selected at the time of occurrence of any of said errors together with a predetermined operation code corresponding to and identifying said error and also means within each of the at least one central processing module for reading the contents of said memory address and code storing means and initiating an error interrupt operation within said at least one central processor module.

21. An improved interrupt apparatus for a data processing system comprising: a plurality of interrupt signal sources distributed throughout said system to be individually activated in response to the occurrence of a plurality of predetermined system conditions, means for receiving and storing the plurality of interrupt signals emanating from said sources, means for connecting said sources to said receiving and storing means, means connected within said system for shifting said data processing system from the execution of normal object programs to the execution of control programs, and means connected to said shifting means for selectively preventing said shifting means from automatically responding to the reception and storage of any one of said interrupt signals.

22. The improved interrupt apparatus as set forth in claim 21 wherein said means for receiving and storing the plurality of interrupt condition signals is an interrupt condition register, and said means connected to said shifting means for selectively preventing the activation thereof is an interrupt mask register with a plurality of AND gates correspondingly connected to each of the locations of the mask register, and means for connecting said gates to the locations of the interrupt condition register for activation by the common occurrence of set signals in corresponding locations of said condition and mask registers.

References Cited

UNITED STATES PATENTS

| 3,286,239 | 11/1966 | Thompson et al. | 340—172.5 |
| 3,419,852 | 12/1968 | Marx et al. | 340—172.5 |
| 3,434,111 | 3/1969 | Schmidt et al. | 340—172.5 |
| 3,440,612 | 4/1969 | Womack | 340—172.5 |

RAULFE B. ZACHE, Primary Examiner